Figure 1:
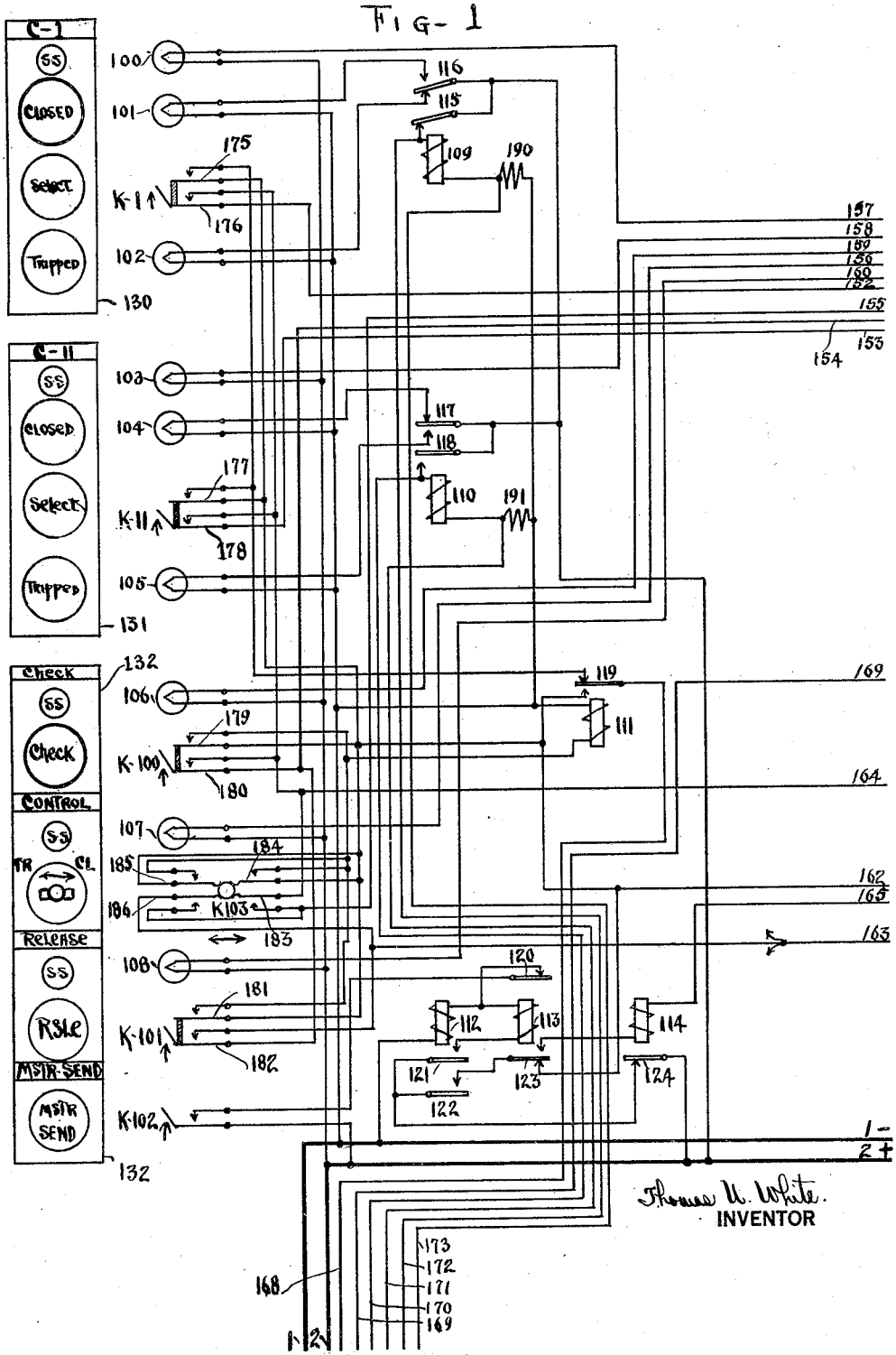

June 16, 1931. T. U. WHITE 1,810,546
REMOTE SUPERVISORY CONTROL SYSTEM
Filed Jan. 28, 1927 12 Sheets-Sheet 1

Fig. #5

Fig. 6

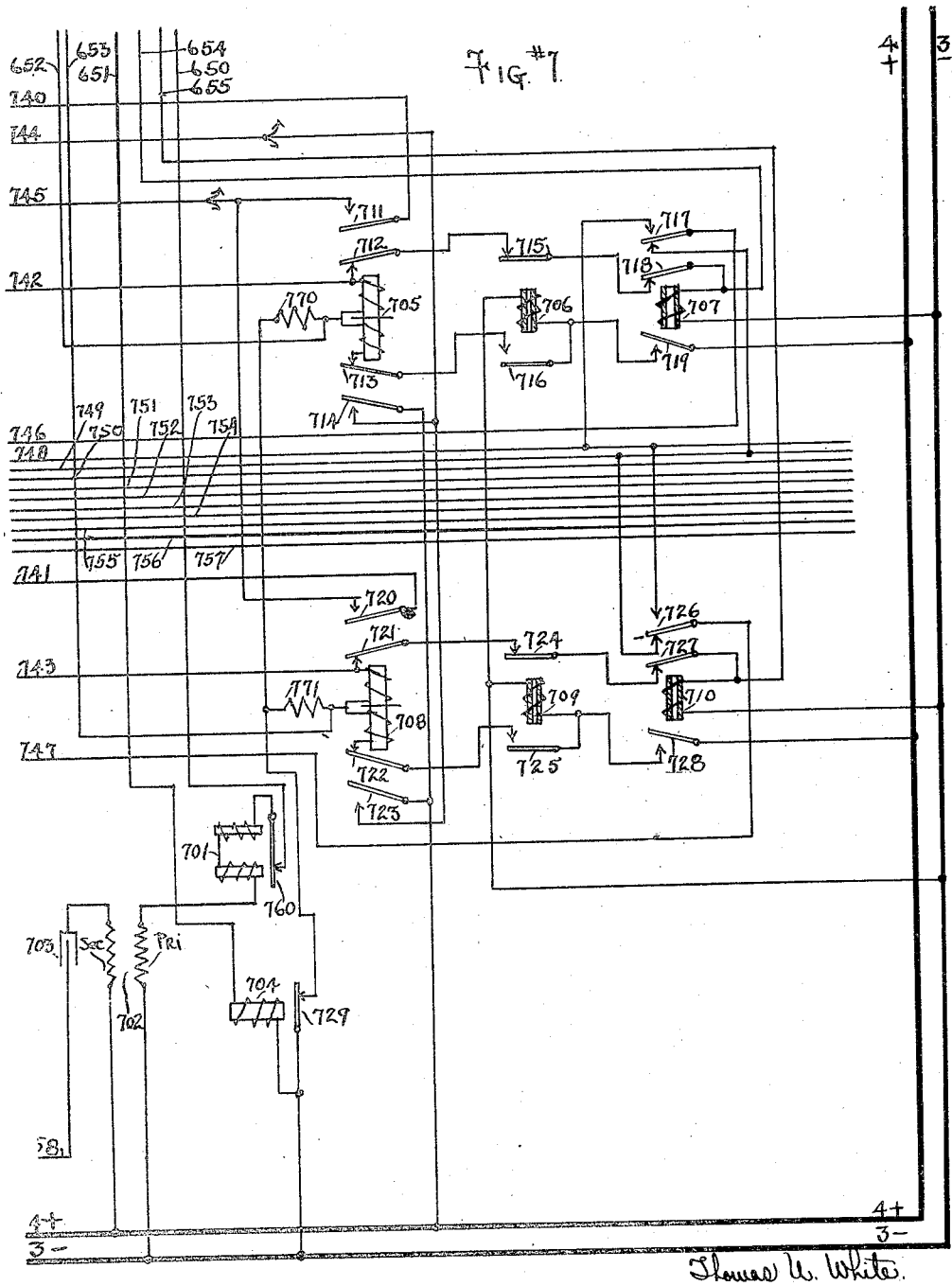

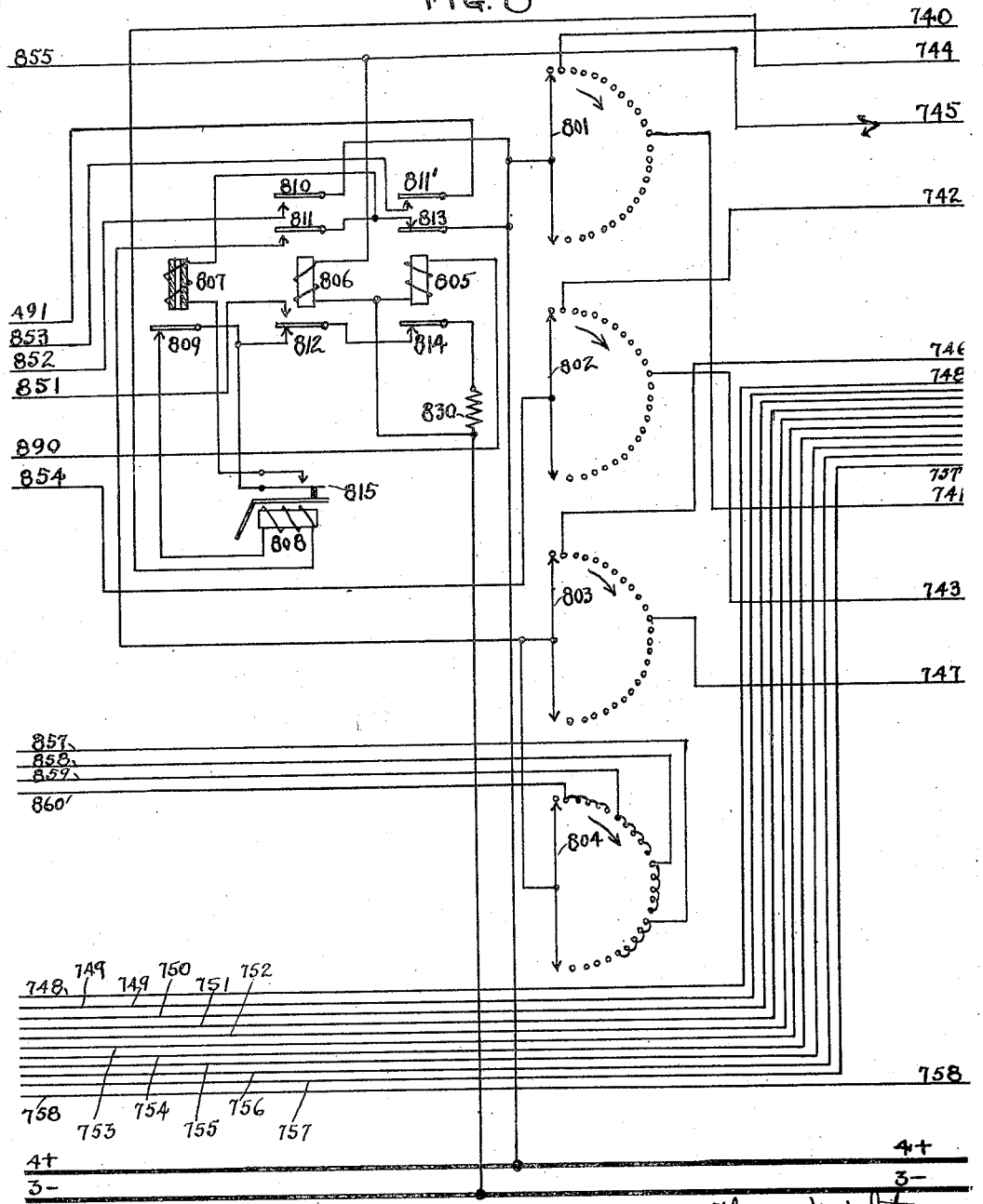

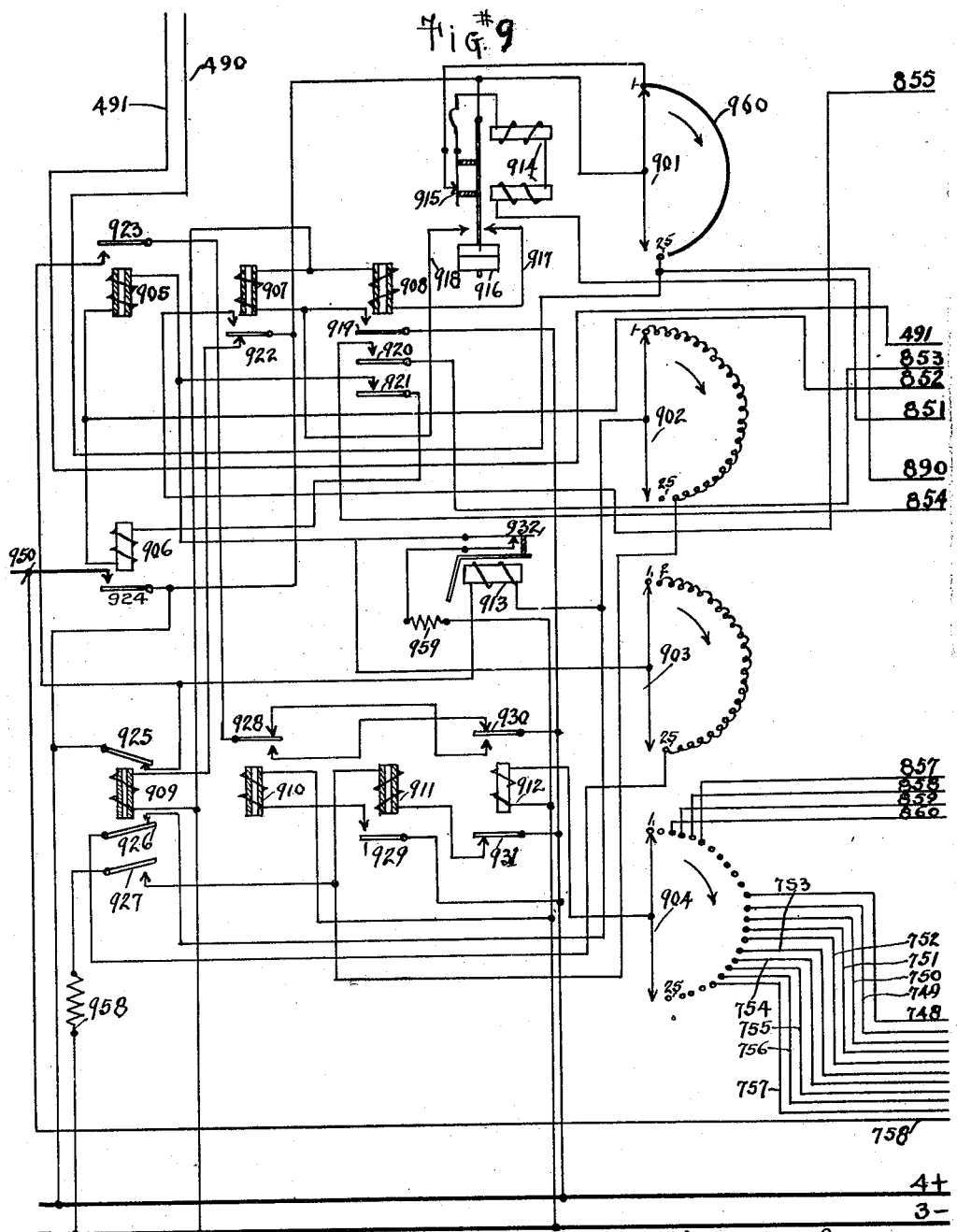

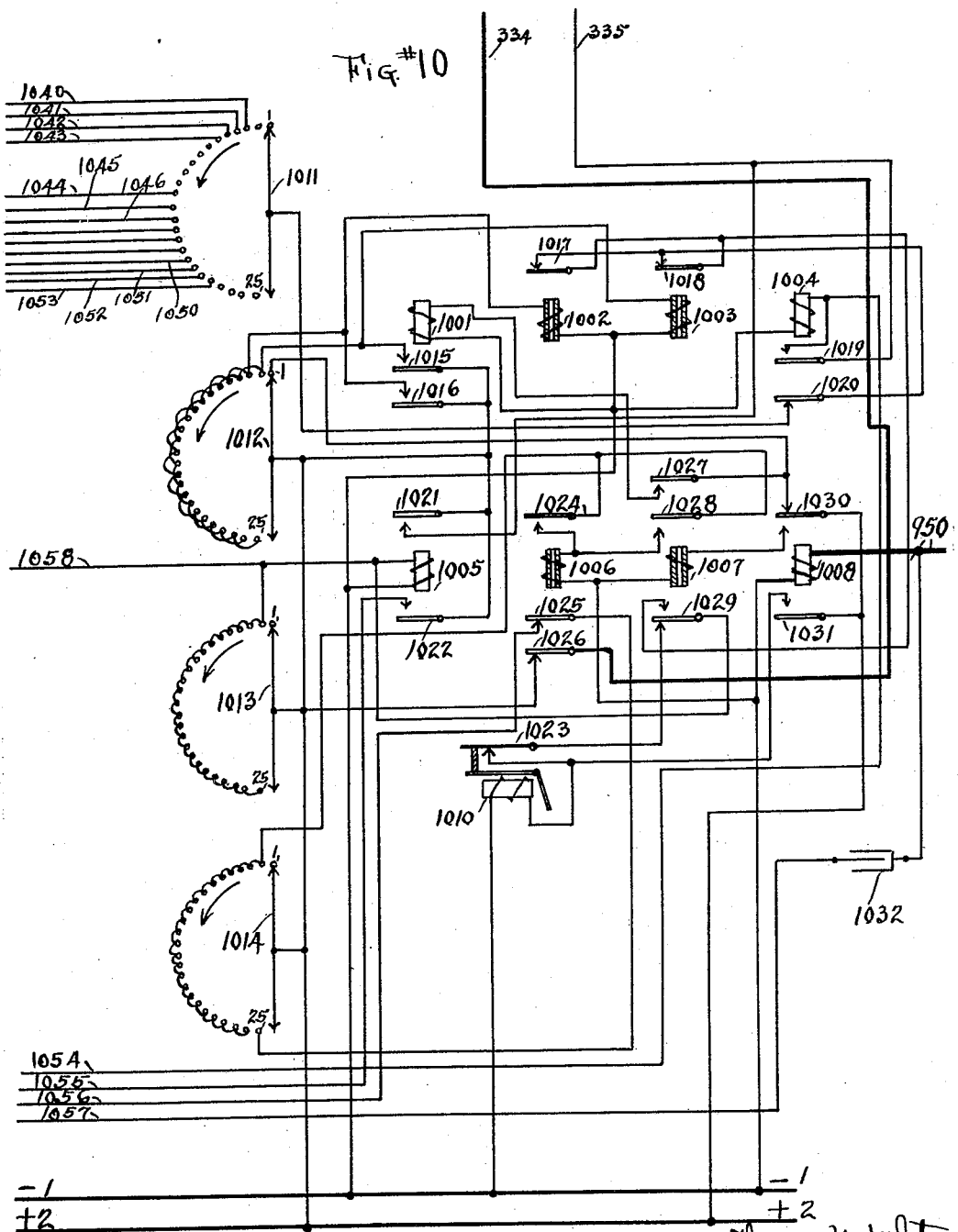

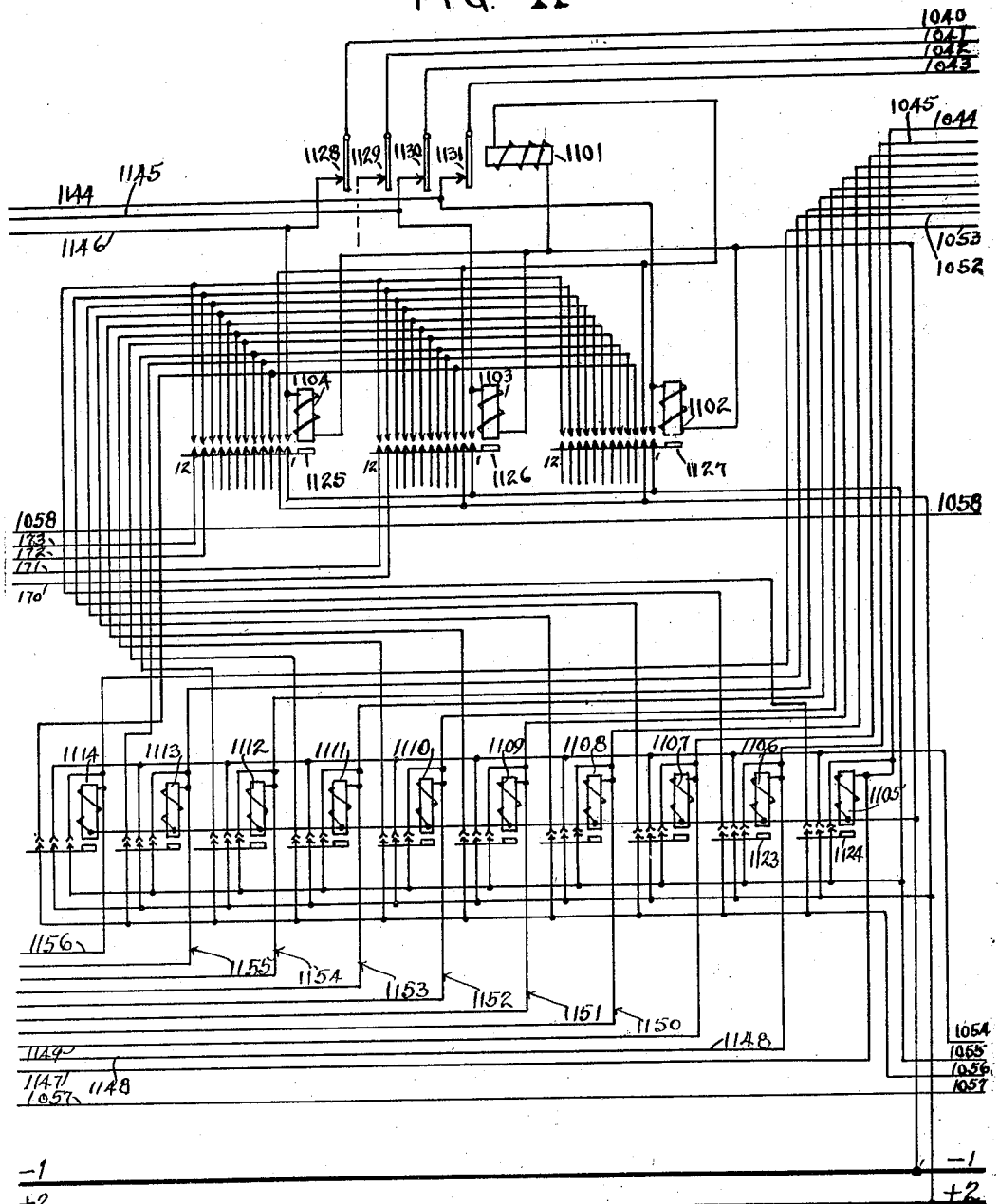

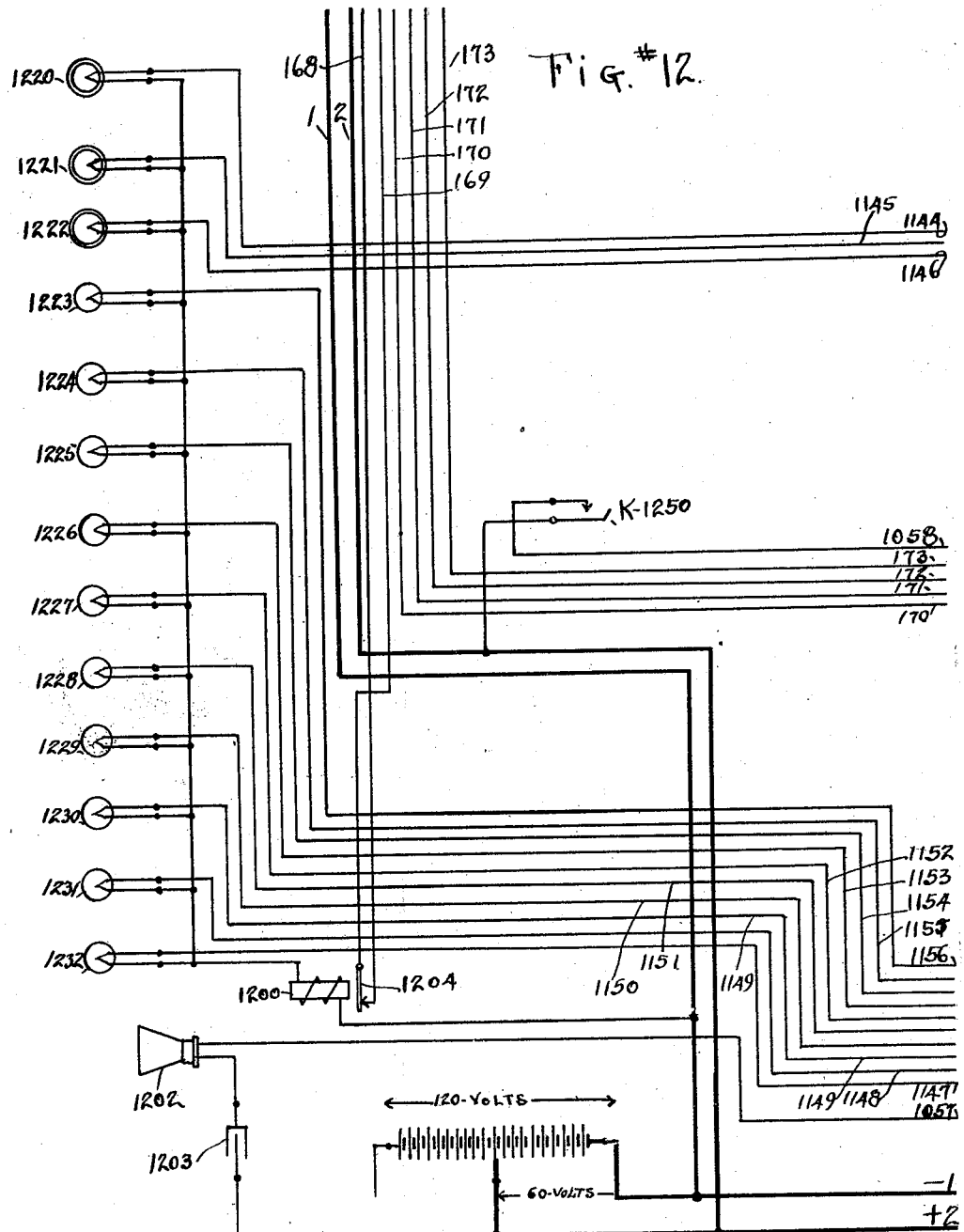

Patented June 16, 1931

1,810,546

UNITED STATES PATENT OFFICE

THOMAS U. WHITE, OF GENOA, ILLINOIS, ASSIGNOR TO LEICH ELECTRIC CO., OF GENOA, ILLINOIS, A CORPORATION OF ILLINOIS

REMOTE SUPERVISORY CONTROL SYSTEM

Application filed January 28, 1927. Serial No. 164,247.

My invention relates in general to remote supervisory control systems, which is that class of signaling systems by which a remotely disposed apparatus may be controlled and supervised from a central or controlling station.

More particularly, my invention embodies a selective signalling means by which any one of a plurality of remotely disposed apparatus units may be selectively operated, or supervised at the will of an operator or dispatcher at a central or controlling station, over a three conductor trunk line circuit or the equivalent thereof, comprising a two-way metallic signalling circuit.

While signalling systems of this type may be employed in the remote control of machinery of many types, heating or temperature regulating devices and many other types of apparatus, I have illustrated my invention as applied to the control and supervision of remotely disposed power switching devices of the type called circuit breakers. It is understood that this is done for purposes of convenience as my invention is not limited to use in connection with the particular apparatus illustrated in this application.

The most important requirement of this type of signalling system, is that the selecting, controlling and supervising devices must be infallibly accurate in performance of their functions, and that arrangements must be provided to safeguard and check the various signalling operations, and the transmission of the impulses which govern selecting operations.

Frequently it is desired to control and supervise, from a central or load dispatcher's office, a plurality of circuit breakers of the type described herein, and located at a distant substation over a signalling circuit consisting of open line wires strung on the same supports with the high voltage power transmission conductors.

The signalling conductors are subjected to inductive disturbances from the high voltage power transmission line, and may become crossed, grounded or opened. In any case the remote supervisory control system must be so designed that the various impulses comprising the selecting, controlling and supervising codes may be transmitted and checked so as to prevent the false operation of the circuit breakers at the remote station, or the false registration of supervisory signals before the dispatcher.

Actual experience has proven that the most satisfactory results can be accomplished when the selecting codes transmitted over such open line conductors, parallel to the high voltage line, consist of various combinations of long and short impulses.

The use of codes consisting of different combinations of long and short impulses, also permits of the use of inexpensive impulse repeaters, and makes possible the operation of the system by wireless impulse transmitting and receiving equipment.

My invention is, therefore, well adapted to use where open line signalling conductors are strung parallel to, and close to the high voltage transmission line.

My invention includes means for selectively causing the opening and closing of any of the remotely disposed circuit breakers or switches, located at a distance from the controlling or central station, together with means for indicating at such central station, when the switches are so open or closed, and also when any of the said switches are opened or closed automatically, i. e., by means not set in operation at the central station.

One object of my invention is to provide a simplified means of selecting any one of a plurality of remotely located apparatus units, from a central or dispatching office, so as to cause the connection of its interposing operating devices to a remote control equipment, without causing the operation of said apparatus unit.

Another object of the invention is to provide a three conductor signalling system in which all selecting, controlling and supervising codes consist of the same number of impulses, the distinction between codes lying in the relative location of two pause points at which selections are prepared, with a protective and checking third pause which completes selecting or controlling operations only in case such codes are correctly transmitted.

Another object of the invention is to provide a means operative by such selective codes to enable the dispatcher to obtain a visual indication of the number and position of any apparatus unit selected for control, or observation, without causing the operation of said apparatus unit.

Still another object of the invention is to provide means to apprise the dispatcher of the selecting code being transmitted. Thus, should the dispatcher set up several selecting operations on his switchboard, he is apprised of the particular one which is being performed at all times, and the order in which the selecting codes are transmitted from his office to the remotely disposed station is clearly indicated.

Still another object of the invention is to enable the dispatcher to set up a plurality of operations on his switchboard at one time, and complete the operations in any desired order. By my invention the dispatcher is at all times apprised of the operation of his impulse sending and selecting devices by visual indications.

Still another object of the invention is to provide means operative upon a change in position of an apparatus unit at the remote station, to cause the continuous transmission of a supervisory code consisting of different combinations of short and long impulses from a remote station to a dispatcher's or supervisory office, until such code has been correctly transmitted to effect the proper operation of supervisory signals at the dispatcher's switchboard, corresponding to the change in position of the apparatus unit that has taken place.

In the particular form of my invention shown in the drawings, a dispatcher at station No. 1 has before him a plurality of selecting keys each corresponding to a remote apparatus unit, and, common to all the selecting keys, a series of operating keys; these operating keys in this instance include a checking key, to check the selection made, a double throw position changing key to open or close the unit selected, a release key for releasing the selection made, and, common to all the above keys, a master sending key which must be in closed position to effect the sending of the codes indicated by any of the above keys.

Associated with each selecting key are visual indicating lamps indicating the position of the remote unit to which that key is allotted. Also there is associated with every key except the master sender, a lamp indicator informing the dispatcher when a code is being transmitted by that key. In addition there is an audible or buzzer device which indicates when a selection of a unit has been attempted and an answer returned that such selection of the desired unit has been made. This buzzer continues to sound so long as a selection is held. To operate the device the dispatcher closes a desired selector key and presses the master sender key which sets in operation a finder switch, which when it reaches the position corresponding to the selected selector key will connect in a code sender; this code sender will then send the proper selecting code to the selecting devices at the remote station; sending of this code is indicated to the despatcher by the code lamp. If the code is received correctly as sent, the selection will be made and at the end of the code an audible answer sent back. If the code is not received as sent, the audible answer will not be returned and no selection will be made. When a unit has been selected, no further unit may be selected until that one has been released because the selecting operation automatically disconnects the selection received from the sending switch.

After receiving the answer-back signal the dispatcher may by pressing the checking key and master key send a checking code through the finder and sender switch devices which, if correctly received at station No. 2, will cause the sending of a return code that will light up a certain pair of supervisory lamps at station No. 1 indicating which unit has been selected and what its position is. This, it will be noted, gives a double check since even though by some crossing of wires or other mix-up the audible answer back is obtained when a selection is made, if it was not the proper selection the checking code returned will show the discrepancy to the dispatcher.

Assuming that the checking code agrees with the selection made, the dispatcher now has visual indication of the unit selected and its position. He may now, by moving the control operating key to "open" or "close" position and by again pressing the master key send a code through to change the unit's position. This code also answers back, but visually this time by indicating at the key corresponding to the unit selected that said unit has changed position. This is done by cutting off one lamp and lighting the other. The result of this operation may also be checked by sending a checking code and obtaining a verification on the supervisory indicating lamps.

At any time after a selection has been made, it may be released by closing the release key and pressing the master sending key whereby a releasing code is sent to the unit, releasing it from the control devices and this is indicated to the dispatcher by the silencing of the buzzer or audible answering device.

Sending of a checking code after release of a selection or at any time when no selection has been made at the station No. 2 causes return codes to be sent from station No. 2 for all units to indicate their respective positions one at a time on the supervisory lamp bank at station No. 1.

Sending of any code by the dispatcher may be stopped at any time before it ends by releasing the master sending key and the code sending devices will return to normal position without affecting the unit.

If at any time there is a change in position of one or more units at station No. 2 from any cause whatsoever, a supervisory code is immediately sent to the dispatcher indicating such change, and unless such code is correctly received at the dispatching station it will be automatically repeated until it is correctly received. This is done by three relays associated with each unit at station No. 2 together with the code finder and sender switches at station No. 2 which control the sending of all codes from station No. 2. The sending of a supervisory or position indicating code from station No. 2 interrupts any code that is being sent by the dispatcher and prevents his sending any code until the indication has been correctly received at the dispatching station.

The supervisory signal lamps of any unit may also be held at any time the dispatcher desires to compare them with the position indicating devices associated with the selecting keys and when released, the supervisory code sender will report to the dispatcher any other unit which has changed position.

All codes are sent and received over a three conductor system comprising a conductor for codes sent from the dispatcher to station No. 2, a conductor for supervisory codes and answer back signals and a common return conductor for both of the sending conductors.

From the above description of operation it will be clear that a system has been provided whereby the operator is at all times informed of the position of all apparatus units to be controlled and cannot so long as a change in position of a unit is not reported, change the position of any unit. The operator may set up any number of selections of units to be operated and select and operate them in any order he chooses since it is only necessary, if the finder switch first reaches a unit he desires to avoid, to release the master key when the switch will pass to the next unit selected for operation and so on. If at any time a second check is desired, a checking code may be sent.

There are other objects and features of the invention which will be set forth in detail in the following specification, and particularly pointed out hereinafter and in the appended claims.

Figure 2:
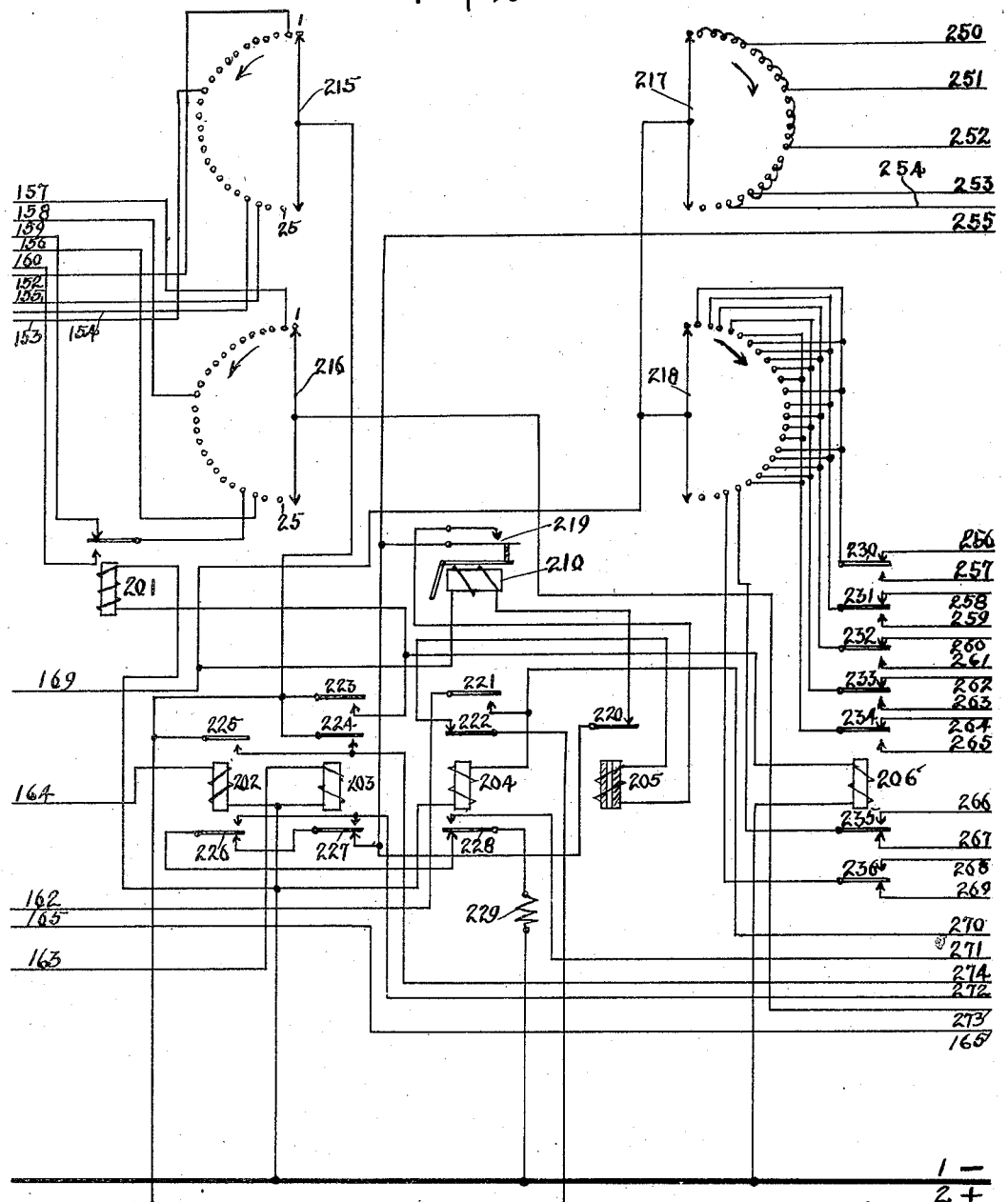
Figure 3:
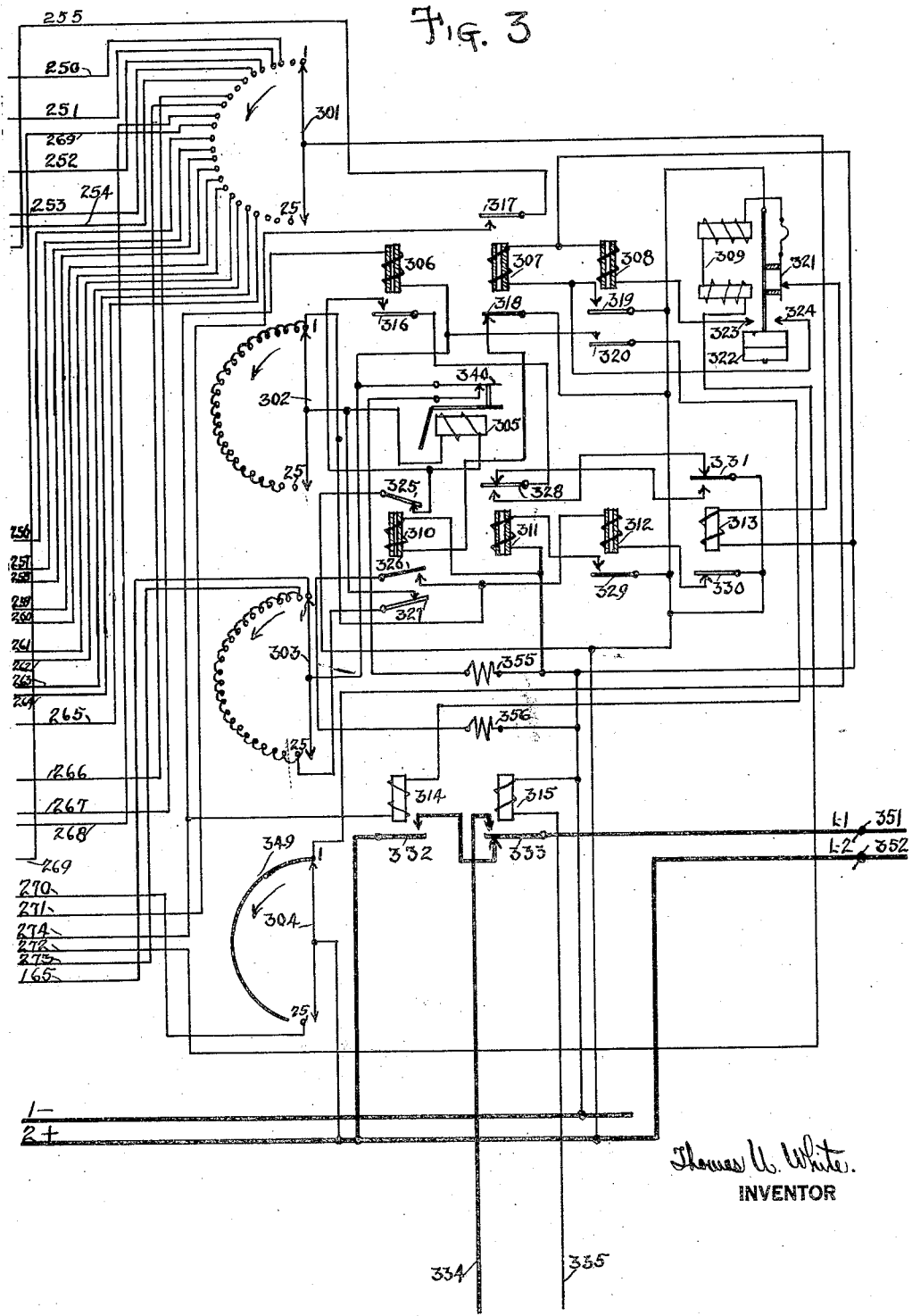
Figure 4:
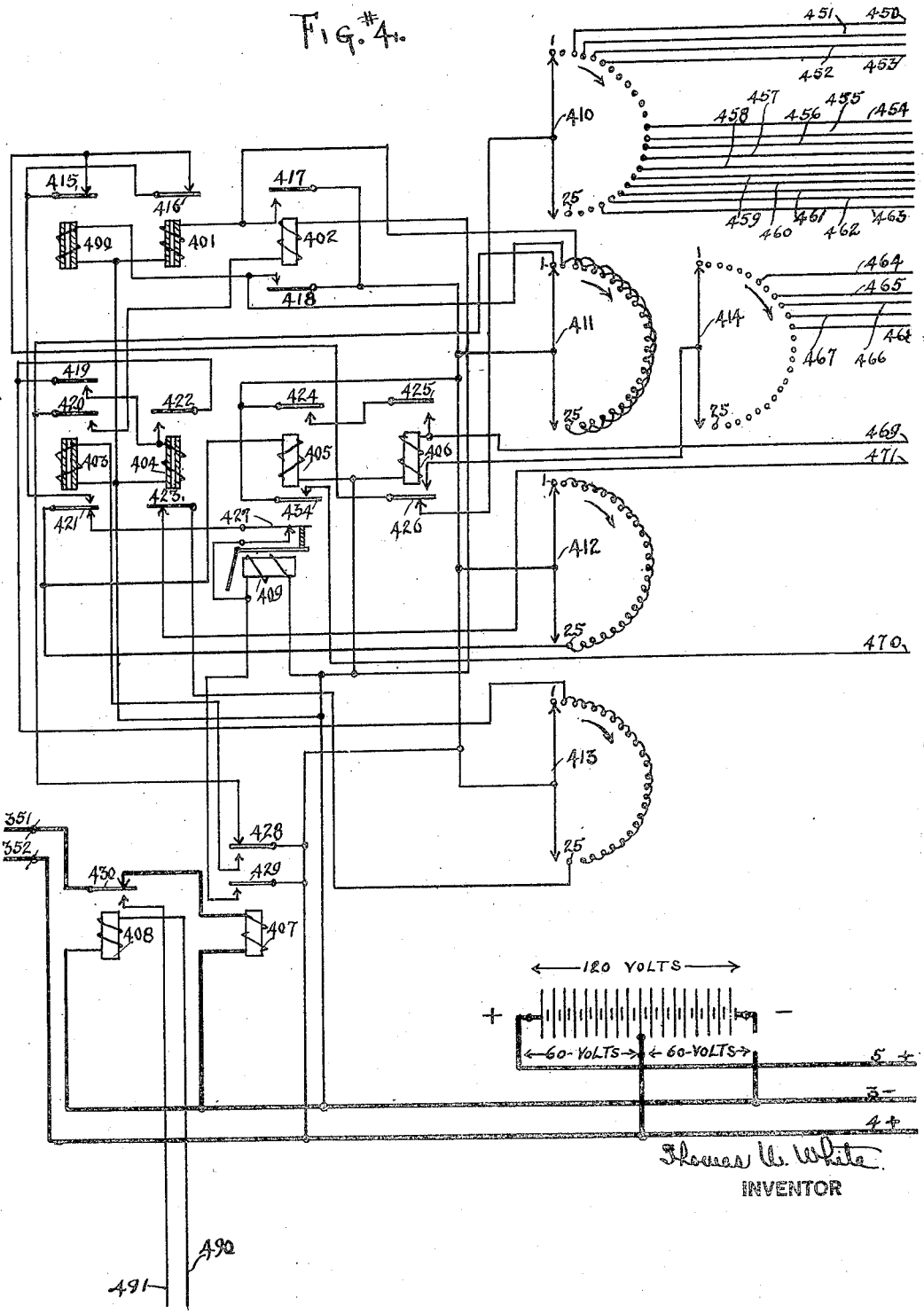
Figure 5:
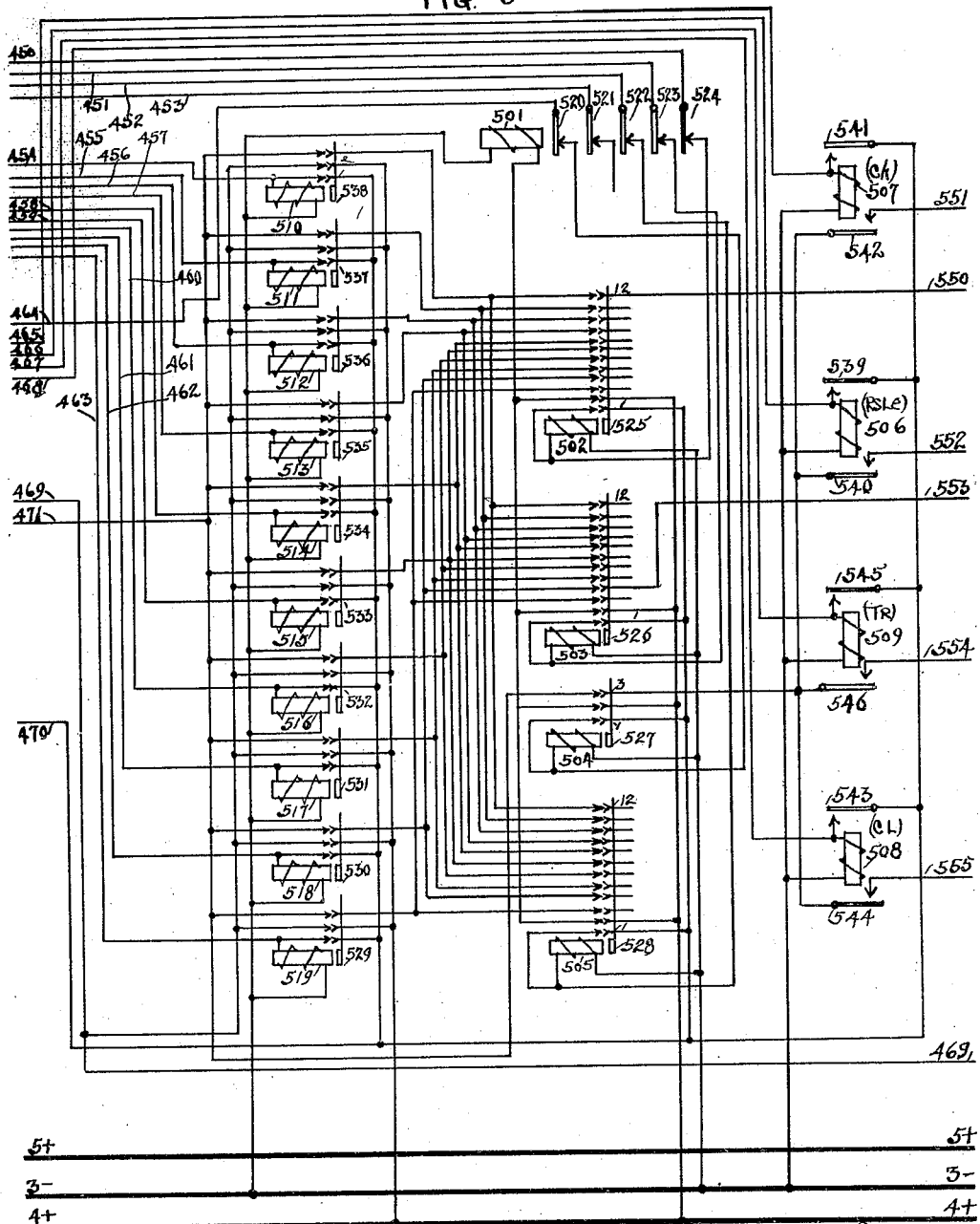
Figure 6:
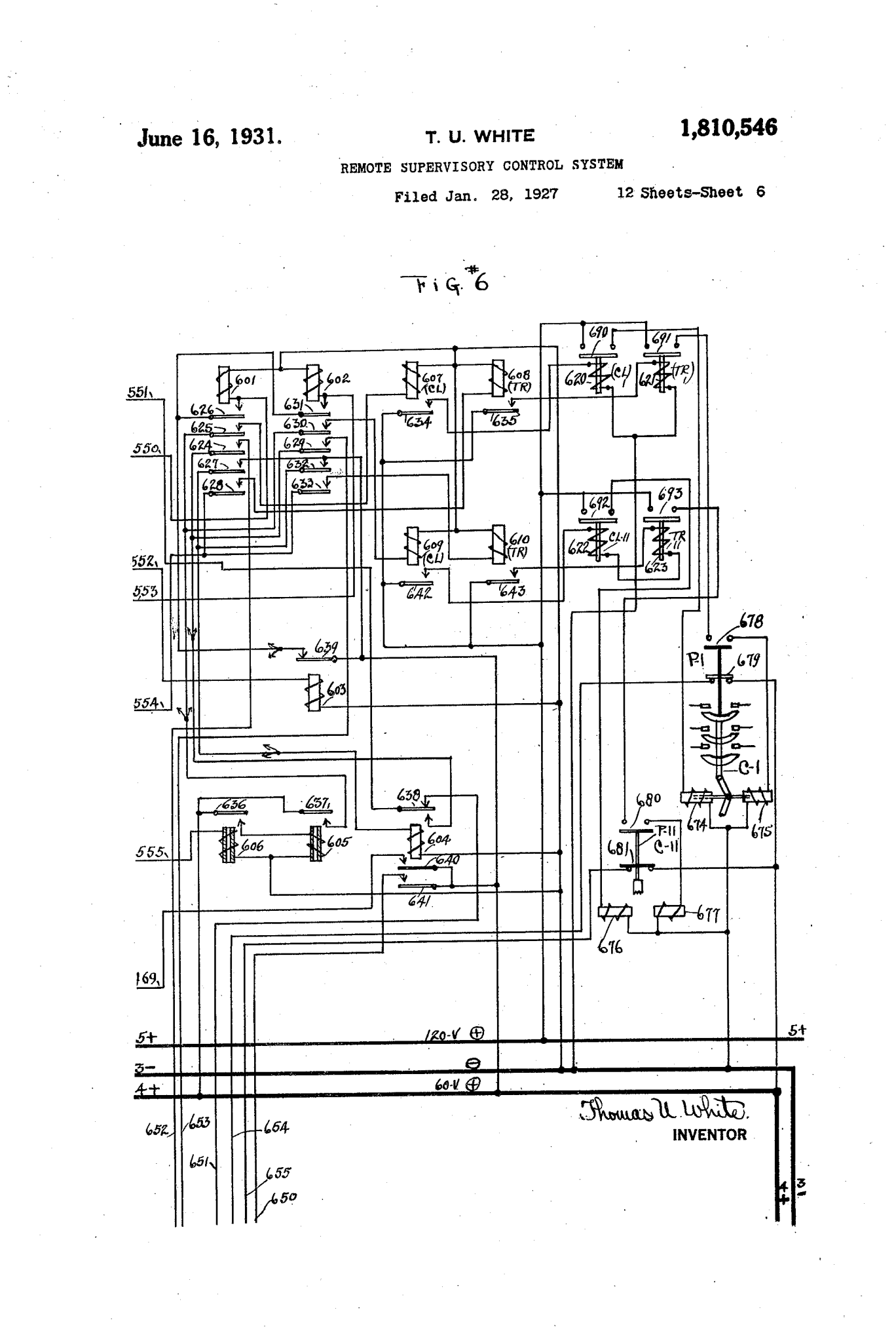

In the accompanying drawings, which illustrate the invention, Figures 1 to 3 inclusive and 10 to 12 inclusive, illustrates schematically the apparatus and circuits located at the central or dispatcher's office, while Figures 4 to 6 inclusive and 7 to 9 inclusive, illustrate schematically the apparatus and circuits located at the distant station.

For the purpose of more conveniently describing my invention, that part of the apparatus and circuits located at the central, dispatcher's, or controlling office will be referred to as located at station #1, while that part of the apparatus and circuits located at the remotely controlled and supervised station will be referred to as located at station #2.

In practicing my invention, I provide a set of selecting keys at station #1, corresponding in number and associated in function with a set of selectable relays at station #2.

When any one of the selecting keys at station #1 is operated and a master sending key is also operated, the code sending operation is started, and a code individual to the selecting key that has been operated, is transmitted to code receiving apparatus at station #2. When the code has been received at station #2, checked and found correct, the selectable relay at station #2, corresponding to the operated key at station #1, is energized.

The energization of the selectable relay at station #2, causes the connection of the interposing electrical controlling circuits of the apparatus unit, to a remote control apparatus at station #2, and the operation of an audible signal to notify the operator or dispatcher at station #1 that the control apparatus associated with such unit has been connected to the remote control device.

The code sending operation is stopped each time the full code has been transmitted. The dispatcher may resend the code until a selectable relay has been operated, as unless the transmitted code is correctly received and checked, no selectable relay will be energized.

A set of master remote control sending keys is located on the operators control panel at station #1. These are the release, check, trip, and close keys, and are common to all remote control operations.

At station #2, when the interposing control apparatus associated with any apparatus unit is connected to the remote control device, the operating circuits of the code receiving apparatus are automatically switched so that the next code received will actuate the remote control device.

Having selected the apparatus unit and caused the connection of its operating circuits to the remote control device, the dispatcher at station #1, may operate a key to check the number and position of the selected apparatus unit and thus verify the operation of the code sending and receiving devices, or he may release the selectable relay, restoring all apparatus at station #2 to normal, or he may close or trip the apparatus unit, as desired.

All codes consist of the same number of impulses, the distinction between codes lying in the relative position of two pause points in the code, at which selections are prepared. The code sending device at station #1 and the code receiving device at station #2 must be in synchronism at the time the final impulse is transmitted and received or the prepared selecting operation will not be completed.

When an apparatus unit at station #2 changes position, a supervisory code sending device is started to cause the transmission of a code corresponding to the change that has occurred, to a code receiving device at station #1. If the code checks correctly a selection is completed to effect the operation of supervisory signals located on the dispatcher's panel at station #1, to indicate the change that has taken place at station #2.

An auxiliary set of lamp signals located on the dispatcher's panel are operated each time a supervisory code is received and a selection prepared. These signals are used to verify the received supervisory codes as well as to record a visual indication before the dispatcher of the number and position of any apparatus unit that he has caused to be connected to the remote control device at station #2. The dispatcher obtains the latter indication by the operation of his "check" key.

The supervisory code sender at station #2 is similar to the code sender at station #1, and the supervisory code receiver at station #1 is similar to the code receiver at station #2.

The method of transmitting and receiving supervisory indications by code is similar to the method used to select and control the operations of the apparatus units from station #1. The principal difference lies in a provision for causing the continuous resending of supervisory codes until the code transmitting and receiving devices correctly check the code and cause the operation of the proper supervisory signals.

In my invention the totalization and checking of the transmitted and received supervisory impulses is accomplished in an improved manner.

Each time the final impulse of the supervisory code is transmitted the code receiver device at station #2 is switched to include certain circuits of the supervisory code transmitter. If the supervisory code receiver has correctly received the code from station #2, the final impulse received by the code receiver at station #1 will cause the operation of the impulse transmitter at station #1 to transmit a single impulse to the code receiver at station #2. If this single impulse is received at the checking or totalization point at which point the supervisory code transmitter has prepared a "check" circuit, there will be certain circuits completed to stop the code sending operation from station #2 and to restore the supervisory interposing code sending equipment to its normal position.

In case certain checking or totalizing circuits are not completed on the final impulse, the code sending operation is continued until such time as the code is correctly transmitted and received. This feature of the invention will be more fully described hereinafter.

A code finder device associated with the code sender equipment at stations #1 and #2 prevents mixing of codes.

Thus, there is a code finder and code sender at station #1 which transmits selecting and control codes to a code receiver and remote control device at station #2.

Similarly, there is a code finder and code sender at station #2 which transmits supervisory indications and selection verifying codes to a code receiver at station #1.

Referring now, more particularly to Figure #1, the keys K—1 and K—11 are selecting keys. These are single throw locking keys of the type ordinarily used in telephony. These keys are operated by a lever action to move their lever springs in the direction shown by the arrow and complete circuits which will be described hereinafter.

The keys K—100, K—101, and K—102 are of the same type as keys K—1 and K—11 and are the master or common selecting and control code sending keys.

The key K—103 is a double throw-locking type key of the type used in telephony. This key is lever operated and has three positions. It has a middle or normal resting position which positions the lever springs as shown on drawing and its lever may be operated as indicated by the arrows to complete circuits to be hereinafter explained. This key is also a master or common key and governs the performance of close or trip operations of apparatus units when same are connected to the remote control device at station #2.

The lamp signals 101, and 102 are supervisory signals associated with apparatus unit C1, while the reference numbers 104 and 105 are given to the supervisory lamp signals associated with apparatus unit circuit 11.

The lamp signals 100, 103, 106, 107, and 108 are code sending signals, used to indicate when the code sender device is sending the code corresponding to the key with which the lamp signals are associated as shown in Figure #1.

All lamp signals are of the type ordinarily used in telephony.

The relay 109 is associated with the supervisory signals of apparatus unit C1, while relay 110 is associated with the supervisory signals of apparatus unit C11. The operation of these relays govern the change in supervisory indications.

The relay 111 is a switch over relay and is used to disconnect the circuits of all selecting keys such as K—1 and K—11 from the code sending circuits, when a check, control or release code is to be transmitted.

The relays 112, 113, and 114 are associated with the master sending key 102 and are used to prevent the transmission of an incomplete or incorrect code should the master sending key 102 be momentarily released while the code sender is transmitting a code.

All relays are of the ordinary fast type used in automatic telephony.

At the reference numbers 130, and 131 are indicated the name plate and arrangement of the apparatus associated with the individual apparatus units, as it is located on the dispatcher's panel, while at 132 is shown the name plate and arrangement of the master or common equipment.

In Figure #2, the relays 201 to 206 inclusive, the stepping magnet 210 and the switch wipers 215 to 218 inclusive with their associated bank contacts, comprise the code finder switch. All apparatus is of the type ordinarily used in automatic telephony.

The stepping magnet 210 and wipers 215 to 218 inclusive with their associated bank contacts comprise a selector switch of such construction, that when the magnet 210 is energized, a pawl and ratchet device associated with the switch wipers, which are arranged on a common shaft, is positioned in such manner as to cause the movement of said switch wipers, one step, when the magnet 210 is again deenergized.

In Figure #3, the relays 306 to 308 inclusive, and 310 to 314 inclusive are associated with stepping magnet 305 and wipers 301 to 304 inclusive, with their associated bank contacts to comprise a code sending device. The stepping magnet 305 when energized positions its pawl and ratchet mechanism on a movable shaft in such a manner that the wipers 301 to 304 inclusive are moved one step around their associated switch contacts, when the magnet 305 is again deenergized.

The relay 315 is a switch over relay used in the code checking circuit.

All relays and selector switch equipment are of the type ordinarily employed in automatic telephony. The relays 306, 307, 308, 310, 311, and 312 are of the slow to release type. These relays have copper slugs or sheaths over their cores to secure a slow to release action in a manner well known in the telephone art.

At 309 is represented schematically a vibrating relay of the type ordinarily employed in pole changers for converting direct to alternating current for bell ringing purposes in telephony. When the twin magnets of the vibrator are energized, the armature 322 is cause to vibrate between the contact points 323 and 324, making contacts at these points for timing relay action in a manner that will be more fully described hereinafter.

In Figure #4, the relays 400 to 407 inclusive, are associated with stepping magnet 409 and its wipers 410 to 414 inclusive and their respective bank contacts, to comprise the code receiving device located at station #2. The stepping magnet 409 is constructed in the same manner as stepping magnet 305. Each time it is energized, the magnet 409 positions a pawl and ratchet mechanism, so that when the magnet is again deenergized, the wipers 410 to 414 inclusive, mounted on a common shaft are rotated one step in their step by step selecting movement over their associated switch bank contacts.

The relay 408 is used in the impulse checking and totalizing circuit in a manner which will be described. The relays 400, 401, 403, and 404 are of the slow to release type as indicated by the shaded lines.

All equipment in Figure #4 is of the type commonly employed in telephone systems.

In Figure #5, the relays 501 to 505 inclusive, and relays 510 to 519 inclusive are associated with the code receiver at station #2 for the purpose of making an individual selection of one of a plurality of apparatus units at the two selection points. At the first pause point a "group" selection is made by the energization of the relays such as 502 to 505 and at the second pause point a particular unit is selected as within that group by means of relays such as 510 to 519 inclusive.

The relays 502 to 505 are commonly termed multi-contact relays, and the relays 510 to 519 are of the same general kind with 3 to 5 make contacts.

The relays 506 to 509 inclusive, are common or master remotely controlled relays and are used to perform the various operations of an apparatus unit after one has been selected, or to "release" or "check" the selection set up by a previous operation of the code receiver.

In Figure #6, the relays 601 and 602 are ordinary telephone type relays which are associated with the apparatus units represented by the characters C—1 and C—11 respectively. These relays when energized connect the interposing control circuits, and the interposing supervisory circuits to the remote control relay circuits.

The relay 603 is associated with the release circuits while relay 604 is associated with the selection and supervisory "checking" circuits as will be hereinafter described.

The relays 605 and 606 are slow to release type relays used in the "closing" control circuits in a manner to be described.

The relays 607 to 610 inclusive are special power type relays which are capable of being operated in a low voltage energizing circuit, but have contacts capable of passing a high voltage and current of about 5 amperes on their make contacts. They are termed power type interposing control relays.

The numerals 620 to 623 are assigned to identify the control circuit contactors associated with the apparatus units C—1 and C—11.

The characters C—1 and C—11 are used to describe the circuits of two apparatus units. The unit C—1 comprises a pallet switch P—1 and solenoids 674 and 675 and mechanical mechanism (not shown). The apparatus unit C—11 consists of a pallet switch P—11, solenoids 676 and 677 and a mechanical mechanism (not shown).

The apparatus units C—1 and C—11, the pallet switches P—1 and P—11 and the contactors 620 to 623 inclusive may be of any of the various types used in power switching systems.

In Figure #7, the relays 705 to 710 inclusive are interposing supervisory relays associated with the apparatus units C—1 and C—11.

The relay 704 is a master checking relay, used as hereinafter explained fully.

At 702 is represented an induction coil of the type ordinarily used in telephony. At 703 is shown a condenser of ordinary type and at 701 is represented a buzzer or tone generating device.

All apparatus shown in Figure #7 is the type well known in the telephone art.

In Figure #8, the relays 805 to 807 inclusive, and the stepping magnet 808 with its associated wipers 801 to 804 inclusive and their respective bank contacts, comprise a code finder mechanism of similar type and purpose to that shown in Figure #2. All apparatus is of standard telephone type.

In Figure #9, the relays 905 to 912 inclusive, the vibrator timing device 914, and the stepping magnet 913 and its associated wipers 901 to 904 inclusive, with their switch banks comprise a code sender device at station #2, of similar type and purpose to that shown in Figure #3.

In Figure #10, the relays 1001 to 1008 inclusive, the stepping magnet 1010 and wipers 1011 to 1014 inclusive with their associated switch banks comprise a code receiver device similar in construction and purpose to the apparatus of Figure #4.

The condenser 1032 is of the ordinary telephone type and is used to permit passage of the answer back signals and cut out other signals as will be fully described.

In Figure 11, the relays 1101 to 1114 inclusive are selecting relays associated with the code receiver device shown in Figure #10. This equipment is similar in construction and purpose to that shown in Figure #5.

In Figure #12, the relay 1200 is used in certain holding circuits to be described later. At 1220 to 1232 are shown lamp signals of ordinary type, which are used in this invention as "tell-tale" code checking and supervisory signals.

The loud speaker 1202 is of the type used in radio work. The condenser 1203 is included in the loud speaker audible signal circuits.

Three line conductors 351, 352, and 950 connect the apparatus at station #1 to the apparatus at station #2.

The line conductor 352 is a common return conductor and connects the positive 60 volt terminal of the 120 volt storage battery at station #1 to the positive 60 volt terminal of the 120 volt storage battery at station #2.

For certain reasons it is not general practice to ground the storage batteries used in power switching stations. The 120 volt battery is used as shown at station #2 for operating solenoid controlled switching devices, and since the relays and selector switch equipment of the usual telephone exchange systems are designed for lower voltage, I tap the regular 120 volt storage battery at the middle point, for a 60 volt positive battery supply and use half of the battery for the power supply of this signalling system.

The line conductor 352 serves as a common return conductor for all signalling circuits of the line conductors 351 and 950.

From the description thus far it is seen that a code sender is employed at station #1 to transmit selecting and control codes to a code receiver and selecting mechanism at station #2, and that a similar code sender is employed at station #2 for transmitting the return supervisory codes to station #1.

A code finder is employed at each point in connection with the code sending devices to prevent mixing of codes and suitable selecting relay equipment is used with each code receiver to provide a means of obtaining a single selecting action.

All control operations are performed in two stages, the preparation and the execution. The preparation does not necessarily cause the execution.

The interposing control relays associated with any desired unit are first selected, and automatically connected to a remote control device. A succeeding code sending operation will check the selection made by causing the supervisory code sender at station #2 to transmit a code to the equipment at station #1, which in turn causes the operation of "tell-tale" lamp signals to apprise the dispatcher of the number and position (open or closed) of the unit that has its interposing control relay equipment connected to the remote control device, whereafter the dispatcher may if desired release the selection made and restore all apparatus at station #2 to normal.

A tone signal notifies the dispatcher when a selection has been made at station #2. This tone signal is continuous so long as any interposing control relay equipment is connected to the selective remote control device.

The interposing control relay equipment of only one apparatus unit may be connected at a time to the remote control device.

The supervisory codes are transmitted continuously or until a correctly checked code results in the operation of supervisory signalling devices to indicate any change that has occurred at the station.

"Checking" codes may be transmitted as often as desired by the dispatcher at station #1.

The detailed operation of the system will now be explained and the features and objects of invention described in detail.

*Selecting remotely located apparatus unit and connection of same to remote control device*

Assuming that it is desired to connect the the interposing control relays associated with the apparatus unit C—1 to the remote control device.

The dispatcher at station #1 operates the key K—1 to move the lever springs in the direction shown by the arrow. He then holds the master sending key K—102 operated.

The relays 112 to 114 inclusive are included in the circuit of the key K—102 in order to cause the instant release of the code transmitting equipment, in case the operator or dispatcher momentarily releases the key K—102 while a code is being transmitted. That is, if he releases the key K—102 before a full code of 25 impulses has been transmitted by the code sender.

When the key K—102 is operated, there is a circuit completed extending from positive battery at contacts of key, armature 120 and back contact, winding of relay 112 to negative battery. Relay 112 is thus energized and completes at armature 121 a circuit for the energization of relays 113 and 112 in series, effective when the original energizing circuit of relay 112 is again opened.

Should the operator or dispatcher momentarily release the key K—102, the circuit of relay 112 is opened and relays 113 and 112 are energized in series. In this case, at armature 123 the starting circuit of the code finder and code sender devices is opened and the code sending operation is stopped. The next code sending operation cannot be started until relay 114 is operated, to in turn cause the release of the relays 112 and 113. Relay 114 will be energized when the wipers of the code sending switch are again on their normal resting point on contact 1 of their respective switch banks.

When relays 112 and 113 are energized in series, they are held energized under control of relay 114. And when the code sender switch is in normal position there is a circuit completed extending from positive battery at armature 122 and front contact, armature 123 and front contact, winding of relay 114, conductor 165, contact point 1 and resting wiper 303, armature 340 and its made contact, winding of resistance 355 to negative battery.

Relay 114 will be energized over this path to release the relays 112 and 113, and open its own energizing circuit at armature 123 when relay 113 is released.

When relay 112 only is energized, a circuit is completed to start the finder switch in operation. This circuit extends from positive battery at armature 124 and back contact, armature 122 and front contact, armature 123 and back contact, lever spring 175 and its made contact on key K—1, back contact and armature 119, conductor 168, back contact and armature 1204, conductor 169, winding of stepping magnet 210, back contact and armature 220, back contact and armature 227, back contact and armature 226, back contact and armature 228, and winding of resistance 229 to negative battery.

The stepping magnet 210 is energized over the above traced path. This is the driving magnet for the wipers 215 to 218 inclusive of the finder switch.

The stepping magnet when energized in the above manner by the operation of the selecting keys such as K—1 and K—11, and the master key K—102, causes the magnet to operate as an interrupter until the wipers 215 to 218 inclusive rest on their respective switch banks to which the operated key is connected. In case more than one selecting key such as K—1 and K—11 is operated the finder switch comes to rest on the operated key points, in the order in which the wipers "find" such points, starting from the last resting point of the wipers. The wipers 215 to 218 inclusive have no normal position.

Each time stepping magnet 210 is energized, a circuit is completed extending from negative battery, winding of resistance 229, armature 228 and back contact, armature 226 and back contact, armature 227 and back contact, armature 219 and made contact, winding of relay 205, back contact and armature 222, to positive battery. Relay 205 is energized over this path.

The relay 205 is of the slow to release type, and each time energized opens at armature 220 a point in the original energizing circuit of the stepping magnet 210. The stepping magnet is thus deenergized to open at armature 219, a point in the original energizing circuit of relay 205. The relay 205 is thus deenergized and retracts its armature 220 after a period of time to again close through the energizing circuit of the stepping magnet 210.

In the above manner, the stepping magnet 210 is operated as an interrupter to advance its wipers 215 to 218 inclusive, step by step, over their associated bank contacts, until the wipers reach the point at which there is an operated key such as K—1 and K—11.

In this case since the key K—1 is operated, when the wipers 215 to 218 inclusive reach bank contact 2 on their respective switch banks, at which point the circuits of the key K—1 are connected, a circuit is effective to stop the operation of the stepping magnet 210 and bring the wipers 215 to 218 inclusive to rest on bank contact 2 of their associated switch banks.

The relay 205 was energized to open the energizing circuit of the stepping magnet 210 and cause its release and the subsequent movement of the wipers 215 to 218 inclusive from contact 1 to contact 2 on their respective switch banks.

The relay 205 is slow to release, and before its armature 220 is released to again close through the energizing circuit of stepping magnet 210, there is a circuit completed extending from positive battery on wiper 215 and resting contact 2 of its associated switch bank, conductor 152, lever spring 176 and make contact of key K—1, conductor 164, and winding of relay 202 to negative battery. Relay 202 is energized over this path, to open at armature 226 still another point in the energizing circuit of the stepping magnet 210.

The finder switch wipers 215 to 218 inclusive rest on contact point 2 until the selecting code determined by the operating key K—1 has been transmitted by the code sender device.

The setting of the wipers of the finder switch determines the code that will be transmitted by the code sender. The bank contacts associated with wipers 217 and 218 are connected to the bank contacts over which wiper 301 of the code sender switch move, in order to determine the various codes.

As another result of the energization of relay 202 the code sender is started into operation. A circuit is completed extending from negative battery at winding of resistance 229, armature 228 and back contact, armature 226 and front contact, conductor 272, winding of vibrating relay 309, armature 321 and back contact, switch bank common bar 349, and resting wiper 304 to positive battery. The common bank bus bar 349 associated with wiper 304 extends from the location for contact 1 to the location for contact 24 as shown on the switch banks for wipers 301 to 303 inclusive. The common contact is broken at contact point 25 as shown so that while the wipers 301 to 303 inclusive are passing over contacts 1 to 24 inclusive of their associated bank contacts, the wiper 304 is resting on common bus bar 349, and moving along this common conducting bar.

The vibrating relay 309 is energized to operate as an interrupter over the above traced path. It will be seen that each time the relay magnets attract the armature 322, that the energizing circuit of the magnets is opened at armature 321, so the relay 309 continues to operate and move the armature 322 as a pendulum, so long as its energizing circuit is closed.

Each time the armature 322 makes contact with contact point 323 a circuit is completed to cause the energization of relay 308. This circuit may be traced from positive battery at pendulum armature 322, contact 323, winding of relay 308 to negative battery. Relay 308 is of the slow to release type and holds its armatures attracted during the vibrating period of the relay 309 over the circuit just traced.

As a result, a circuit is completed extending from positive battery at armature 319 and front contact, winding of relay 307 to negative battery. Relay 307 is energized under control of relay 308 over this path. Another energizing circuit for the relay 307 is completed each time the armature 322 makes contact at contact point 324 on its back swing movement. The circuit is obvious from the drawing.

As a result of the energization of relay 308 a circuit is completed for the energization of relays 306 and 314 in parallel. This circuit may be traced from positive battery at armature 225 and its front contact, conductor 274, winding of relay 306, armature 340 and contact, winding of resistance 355 to negative battery. Relay 306 is energized over this path and when relay 308 is then energized a circuit is completed at front contact and armature 320 to connect the winding of relay 314 in parallel with the winding of relay 306, thus causing the energization of relay 314 also.

The relay 306 is of the slow to release type and retract its armature 316 slowly each time the stepping magnet 305 is energized to time the operation of magnet 305, and the relay 314 is a fast type relay which is deenergized each time the stepping magnet 305 is energized, and energized when it again is deenergized. This relay is therefore operated under control of the stepping magnet 305, and relay 306.

The slow to release relay 310 is normally energized as shown. In this manner restoring circuits for the magnet 305 are completed at armature 327 and front contact, while at armature 326 the energizing circuits of relay 312 are maintained open. The energizing circuit of relay 310 which extended from positive battery at armature 318 and back contact, and winding of relay 310 to negative battery; is now opened at armature 318, by the energization of relay 307.

Relay 310 retracts its armatures after an interval of time, to complete the circuits of the stepping magnet 305 at armature 326 and its back contact. At this same point an energizing circuit for relay 312 is completed.

The energizing circuit for relay 312 may be traced from positive battery at armature 330 and back contact, winding of relay 312, back contact and armature 326, winding of resistance 356 to negative battery.

When 312 is energized, a circuit is completed to cause the energization of relay 311, over a path extending from positive battery at armature 329 and front contact, winding of relay 311 to negative battery.

Relays 312 and 311 are slow to release type and used as will be hereinafter described to time the selecting pause points.

The operating circuit of the stepping magnet 305 is now completed over a path extending from positive battery at armature 331 and back contact, front contact and armature 328, armature 316 and front contact, winding of stepping magnet 305, wiper 302 and resting contact, back contact and armature 326, and winding of resistance 356 to negative battery.

The stepping magnet 305, is energized over the above traced path and positions its associated pawl and ratchet device in such manner that the wipers 301 to 304 inclusive will be moved one step in their step by step rotating action over contacts 1 to 25 inclusive of the switch banks, when the stepping magnet is again deenergized.

When the magnet 305 is energized, the energizing circuit of the relays 306 and 314 is opened at armature 340.

The relay 314 is immediately deenergized, and the relay 306 retracts its armature 316 after a slight interval of time to open at armature 316, the energizing circuit of the stepping magnet 305. The stepping magnet 305 then is deenergized and moves the wipers 301 to 304 inclusive, associated with a common shaft, one step; in this case from contact point 1 to contact point 2 on their respective switch banks.

When the magnet 305 is deenergized in the manner above described, the energizing circuit of relays 306 and 314 is again completed at armature 340, and relays 306 and 314 are again energized.

When relay 306 is again energized the energizing circuit of the stepping magnet 305 is again completed at armature 316. The stepping magnet 305 will then again energize to open the energizing circuits of relays 306 and 314.

In this manner the stepping magnet 305 operates under control of the relay 306 and the relays 311 to 313 inclusive to transmit the dot and dash impulses of the code. The relay 306 is adjusted to time the "dot" impulses and the relays 311 to 313 inclusive operate in cascade in a manner to be hereinafter described to introduce the "dash" impulses or pause points in the code transmitted at certain code points, determined by the connections to the switch bank associated with wiper 301, and the point of rest of the wipers of the finder switch.

Each time the relay 314 is energized, a circuit is completed at armature 332 and front contact, to cause the energization of the relay 407 at the distant station. This operation of the relays 314 and 407 causes the operation of the code receiver at the distant station. The operation of the code receiver will be described after the operation of the code transmitter is described.

The resting point of the wiper 217 of the finder switch determines the position of the first pause point in the code consisting of 25 impulses. The bank contacts associated with wiper 217 are wired to the bank contacts associated with wiper 301 to make this possible.

The code transmitted consists of 25 impulses in each case, there being two selecting pause points and a final totalizing and checking pause point in each code of 25 impulses.

The position of the wiper 218 on its associated bank contacts, determines the position of the second pause point, as the bank contacts of the wiper 218 are also wired to the switch bank associated with wiper 301 to make this possible.

At this time attention is called to the code sending signal feature associated with each key such as K—1 and K—11, by which the dispatcher is apprised of the code which is being transmitted.

When the wiper 303 has been moved from bank contact 1 which is the normal position for all wipers associated with the stepping magnet 305, there is a circuit completed which extends from negative battery at winding of resistance 355, contact and armature 340, wiper 303, contacts 2 to 25 inclusive on switch bank associated with wiper 303, conductor 273, wiper 216 and its resting contact 2, conductor 157, and filament of lamp signal 100 to positive battery.

The lamp signal 100 is lit over this path and blinks in response to the operation of the stepping magnet 305, as each time the magnet 305 is energized the energizing circuit of the lamp 100 is opened at armature 340. The circuit is again closed at armature 340 when the magnet is deenergized.

In this manner, as the magnet 305 steps the wiper 303 over contacts 2 to 25 inclusive the lamp signal 100 blinks as a "tell tale" indication to the dispatcher at station #1, that a code is being sent corresponding to the operated key K—1.

The various sending signal lamps such as 103, 106, 107, and 108 are connected to the bank contacts associated with wiper 216 so that the lamp corresponding to the setting of the wiper 216 will be lit as a "tell tale"

code sending signal. As the setting of the wipers 215 to 218 inclusive determine, as will be apparent from the description to follow, the code which is transmitted, it is seen that the sending signals such as 100, 103, 106, 107, and 108 are "tell tale" supervisory indications of the code being transmitted.

If we assume that the dispatcher will operate more than one selecting key such as K—1 at a time, it is seen that these sending signal indications are important inasmuch as they apprise the dispatcher as to which selection or control code is being sent, and the order in which the codes governing the various operations are being transmitted to station #2.

In previous systems, a lamp signal has been provided to indicate that a key such as K—1 has been operated to set up a code on certain relays, and a common sending signal indicated that the code sender is operating, but since the finder switch which determines the code sending operation, has no normal position, the dispatcher or operator has no means or indication before him to apprise him as to which code of several set up, is being transmitted first. Further, in the systems in question the dispatcher has no indication to apprise him of the order in which any one of several operations may be performed.

In a remote power or machinery control system it is most important that the dispatcher perform the various control functions in a definite order and means are provided to enable him to do so in my invention.

In case the dispatcher or operator has set up several selections, he may watch his sending lamp signals and momentarily release the key such as K—1 to cause the finder switch to advance to another point at which a selection has been prepared; and in this way he can send the various selecting and controlling codes in any order he so desires.

Returning now to the description of the code sending operation, the manner in which the stepping magnet 305 is caused to operate as an interrupter under control of relays 306, and 311 to 313 inclusive has been described. The relay 314, operating with the stepping magnet 305 transmits the "dot" and "dash" code of 25 impulses to the code receiving equipment at station #2.

In this instance, as the wiper 217 is at rest on bank contact 2; when the wiper 301 reaches contact 3 on its associated switch bank, there is a circuit completed extending from positive battery at armature 124 and back contact, armature 122 and front contact, armature 123 and back contact, lever 175 and make contact of key K—1; back contact and armature 119, conductor 168, back contact and armature 1204, conductor 169, wiper 217 and resting contact 2, conductor 250, bank contact 3 and resting wiper 301, and winding of relay 313 to negative battery.

Relay 313 is thus energized as the wiper 301 reaches contact 3 on its switch bank, and as a result the energizing circuit of the stepping magnet 305 is opened at armature 331, and the stepping magnet is deenergized to hold relays 306 and 314 energized.

However, the energizing circuit of the stepping magnet 305 will be again closed after an interval of time which provides the first pause selecting point. The relay 314 remains energized over circuits previously described, during the "pause" point. The relay 407 of the code receiver at station #2 is held energized over the line conductors due to the energization of relay 314, to provide a means of completing a selecting circuit which will be described later.

When relay 313 is energized, the energizing circuit of relay 312 is opened at armature 330. Slow release relay 312 retracts its armature after a period of time to open the energizing circuit of relay 311 at armature 329. Slow release relay 311 then retracts its armatures after a period of time to again close the energizing circuit of the stepping magnet 305. The circuit for again energizing the magnet 305 may now be traced from positive battery at armature 331 and front contact, back contact and armature 328, armature 316 and front contact, winding of stepping magnet 305, wiper 302 and its resting contact 3, back contact and armature 326, winding of resistance 356 to negative battery.

The stepping magnet 305 is now energized over this path and opens the energizing circuits of relays 306 and 314 at armature 340. Relay 306 then retracts its armature 316 after a slight interval of time to again open the energizing circuit of the stepping magnet 305. The wipers are then stepped onto bank contact 4 at which point the energizing circuit of relay 313 is again opened and relay 313 is deenergized, to in turn cause the energization of relays 312 and 311 in cascade.

The energizing circuit of the stepping magnet 305 is then completed in the manner first described and the operation of the code sender proceeds. The stepping magnet and relays 306 and 314 operate to transmit another series of "dot" impulses, until the second "pause" point is reached by the wiper 301. The second pause selecting point is controlled by the position of the wiper 218 with respect to its associated bank contacts.

The wiper 218 is resting on contact #2 of its associated switch bank and this contact #2 is wired to bank contact #13 on the switch bank associated with wiper 301.

Thus, when the wiper 301 reaches its bank contact 13, the second "pause" point will occur in the code of 25 impulses being transmitted. At this point there will be a circuit completed extending from positive battery at armature 124 and back contact, armature 122 and front contact, armature 123 and back contact, lever spring 175 of key K—1 and its upper contact, back contact and armature 119, conductor 168, back contact and armature 1204, conductor 169, wiper 218 and contact 2 on its switch bank, armature 230 and back contact, conductor 256, bank contact #13 of the switch bank associated with wiper 301, resting wiper 301, winding of relay 313 to negative battery.

Relay 313 is energized over this path to introduce another pause in the code being transmitted by the code sender.

The circuits over which stepping magnet 305 is energized at the end of the pause are the same as previously described.

In the above manner selecting pause points are introduced at points 3 and 13 in the code of 25 impulses transmitted, as the wipers 301 to 304 inclusive operate step by step over the contacts of their associated switch banks.

A third pause is introduced when the wipers 301 to 304 reach the 25th contact point on their respective switch banks. The 25th impulse transmitted by the relay 314 is therefore a "dash" impulse. This final pause is introduced for the purpose of checking the action of the code receiving selector switch against that of the code transmitter.

The wipers of the code receiver selector switch must rest on the 25th contact of their respective switch banks, at the time the third and final pause period is received and transmitted by the code transmitter or no selection will be made at the distant station #2.

The circuit arrangements for introducing the third and checking pause by the code transmitter, differ however, from that described for the first two selecting pause points.

When the wiper 302 reaches contact 25 on its switch bank the energizing circuit of the stepping magnet 305 is opened and this magnet 305 is deenergized. Relays 306 and 314 then are energized over a path previously traced.

When the wiper 304 moves to contact 25 on its switch bank, the energizing circuit of the timing relay 309 is opened. However, the pendulum 322 continues to vibrate for a period of time between contacts 323 and 324 to complete circuits previously described.

With the wiper 304 on contact 25 of its switch bank, a circuit is completed, extending from positive battery on wiper 304, resting contact 25 on switch bank, conductor 270, winding of relay 204 to negative batery.

Relay 204 is held energized over a path which extends from positive battery at armature 124 and back contact, armature 122 and front contact, armature 123 and back contact, conductor 162, armature 221 and front contact and winding of relay 204 to negative battery.

A circuit is now completed which extends from negative battery, winding of resistance 229, armature 228 and front contact, conductor 271, front contact and armature 317, conductor 255, armature 220 and back contact, winding of stepping magnet 210, conductor 169, armature 1204 and back contact, conductor 168, armature 119 and back contact, contact and lever 175 of key K—1, back contact and armature 123, front contact and armature 122 and back contact and armature 124 to positive battery. The stepping magnet 210 is energized over this path.

After a period of time, the pendulum 322 will come to rest midway between contact points 323 and 324. The energizing circuit of relay 308 is then opened at contact 323 to cause the slow release relay 308 to retract its armatures.

At armature 320 the energizing circuit of relay 314 is opened and this relay releases. The relay 407 at station #2 is thus released with results to be described later.

At armature 319 the energizing circuit of relay 307 is opened and relay 307 is deenergized and retracts its armatures after a slight period of time as the relay 307 is of the slow-release type.

At armature 317 the energizing circuit of stepping magnet 210 is again opened. The magnet 210 then steps its wipers from the contact point #2 on their respective switch banks. This operation of the finder switch permits the switch to "find" another operated key such as K—1 and prepare to transmit the next code, however, the code cannot be transmitted at this time due to the energization of relay 204, which has opened the circuit of relay 309, at armature 228.

At armature 318, the energizing circuit of relay 310 is again completed and relay 310 is energized. As a result, a circuit is completed to energize the stepping magnet 305 and return the wipers 301 to 304 inclusive to their normal position on contact #1 of their switch banks.

This circuit may be traced from negative battery at winding of resistance 355, contact and armature 340, wiper 303, and its bank contact 25, armature 327 and front contact, winding of stepping magnet 305, front contact and armature 325 to positive battery. Stepping magnet 305 energizes, opens its energizing circuit at armature 340 and deenergizes to move the wipers 301 to 304 inclusive to contact 1 on their respective switch banks, which is the normal position for the wipers. At this position the circuit just traced is open.

As a further result of the energization of relay 310, the energizing circuit of relay 312 is opened at armature 326 and relay 312 is deenergized to in turn deenergize relay 311.

The code sender is now restored to its normal position.

No further code sending operations can be started so long as the relay 204 of the finder switch circuit, remains energized. This relay is held energized under the control of the key K—102 and relays 112 and 113.

The relay 314 has transmitted 25 impulses to the code receiving relay 407 and in case the code receiver has correctly registered the code, a selection has been made of the apparatus unit corresponding to key K—1. We will assume that the code has been correctly received and now describe the operation of the code receiver at station #2.

Each time the relay 314 is energized there is a circuit completed extending from positive battery at station #2 (60 volt positive tap on 120 volt battery), conductor 352, armature 332, and front contact, back contact and armature 333, conductor 351, armature 430 and back contact and winding of relay 407 to negative battery at station #2. The relay 407 is energized over this path each time relay 314 is energized and is deenergized each time the relay 314 is deenergized.

The code of 25 impulses included 3 " dash " or long pause points at which time the relay 407 remained energized. The pauses or " dash " impulses occurred at impulse points 3, 13, and 25.

Relay 407, when energized, completes a circuit extending from positive battery at armature 429 and front contact, and winding of stepping magnet 409 to negative battery.

Stepping magnet 409 is energized over this path and positions its pawl and ratchet mechanism in such manner that the wipers 410 to 414 inclusive, associated with a common shaft are advanced one step over their bank contacts, when the magnet 409 is again deenergized.

Another result of the energization of relay 407, is that at the front contact of armature 428 a circuit is completed to cause the energization of relay 403. This circuit may be traced from positive battery at armature 428 and front contact, winding of relay 403 to negative battery.

Relay 403 is the slow to release type, and will not retract its armatures during the rapid operation of the relay 407, and since relay 407 is energized during the pause or " dash " points in the code the relay 403 will remain energized during the entire code receiving operation.

At armature 421 and back contact, the interrupting circuit by which the circuits of magnet 409 are restored to normal position, is opened. At armature 421 and front contact, certain selecting circuits are prepared which will be explained later.

When the wipers 410 to 414 inclusive have been advanced to contact point 2 on their respective switch banks by the operation of the relay 407 in response to the impulses received, there is a circuit completed, which extends from positive battery at wiper 413 and its resting contact, armature 419 and front contact, and winding of relay 404 to negative battery. Relay 404 is energized over this path, and is held energized over a circuit which extends from positive battery on wiper 413 and all contacts 2 to 24 inclusive of its switch bank, armature 422 and front contact, winding of relay 404 to negative battery. The relay 404 is of the slow to release type and the purpose of the relay and circuits just traced is to hold certain final selecting circuits open at armature 423 during the operation of the wipers 410 to 414 inclusive over contacts 2 to 24 inclusive of their respective switch banks.

As another result of the energization of relay 403, there is a circuit prepared at armature 420 for the energization of relay 402. Each time the relay 407 is released (after the energization of relay 403), there is a circuit completed extending from positive battery at armature 428 and back contact, armature 420 and front contact, and winding of relay 402 to negative battery. Relay 402 is thus energized and at armatures 417 and 418 completes obvious energizing circuits for relays 401 and 400 respectively.

Also, as the wiper 411 passes over its bank contacts 2 to 25 inclusive, alternate energizing circuits are completed for the relays 400 and 401.

The purpose of the slow release relays 400 and 401 is to complete selecting circuits at the pause points in a manner which will be later described. These relays hold their armatures attracted until the pause points are introduced in the received code, at which time one or the other will retract its armature to complete selecting circuits of the wiper 410.

As the wiper 412 is operated over contacts 2 to 25 inclusive of its switch bank, there is a circuit completed which extends from positive battery at wiper 412 and resting contact, winding of relay 405 to negative battery. Relay 405 is energized over this path to prepare at armature 424 and front contact a holding circuit for the relay 406 effective when this relay is energized. At its armature 434, other holding circuits are prepared, which will be described later.

As a result of the code transmitted from station #1 in the manner described in connection with the selecting operation of the key K—1, the first pause period in the code occurs when the wipers of the transmitting switch are on contact 3 of their respective switch banks. If the code receiver has correctly registered the code, as we will assume, the first pause will likewise find the wipers 410 to 414 on contact 3 of their respective switch banks.

The relay 407 is held energized as is relay 403 during the pause period.

The energizing circuit of relay 402 is held open and relay 402 is released during the pause period. The energizing circuit of relay 401 is maintained as the wiper 411 rests on bank contact 3, but the energizing circuit of relay 400 is opened at both the armature 418 and at the switch bank of wiper 411.

The relay 400 therefore retracts its armature 415 after an interval of time, to complete a circuit which extends from positive battery at wiper 412 and resting contact in switch bank, armature 421 and front contact, back contact and armature 415, armature 426 and back contact, wiper 410 and resting bank contact 3, conductor 450, armature 524 and back contact, and winding of relay 502 to negative battery. Relay 502 is energized over this path. The relay 502 is a multi-contact type having 12 sets of "make" (when energized) contacts.

One result of the energization of relay 502 is that a circuit is completed which extends from positive battery at armature 434 and front contact, conductor 470, the first set of make contacts on relay 502, winding of relay 502 to negative battery. A holding circuit under control of relay 405 and the wiper 412 is completed for the relay 502 over this path. The purpose of this circuit is to hold relay 502 energized until the code receiving switch is returned to its normal position. The code receiving switch positions all wipers on contact point 1 of their switch banks when the switch is in its normal position.

As a further result of the energization of relay 502, a circuit is completed which extends from positive battery at its made contact 2, winding of relay 501 to negative battery. Relay 501 is energized to open at armatures 520 to 524 inclusive, the original energizing circuits of all relays such as 502, 503, 504, and 505 which may be energized during the first pause period in the code of impulses received.

The relays such as 502, 503, 504, and 505 are used to select the particular group in which the desired final selection relay is located, there being ten final selection relays 510 to 519 inclusive, one of which must now be energized to complete the circuit for making the desired selection.

The relay 407 now receives "dot" or short impulses until the 13th impulse is received. As this impulse is received another dash or pause period occurs.

The result is that at this point with the wipers 410 to 414 inclusive resting on contact 13 of their associated switch banks, the relay 400 is again deenergized and retracts its armature 415 to complete a circuit which extends from positive battery at wiper 412 and resting contact, armature 421 and front contact, back contact and armature 415, armature 426 and back contact, wiper 410 and resting contact 13 on switch bank, conductor 454, winding of relay 510 to negative battery.

Relay 510 is energized over this path and at made contact 1 a circuit is completed which extends from positive battery at armature 434 and front contact, conductor 470, made contact 1 on relay 510 energized, and winding of relay 510 to negative battery. The relay 510 is maintained energized over this path under control of relay 405, until the code receiver switch is restored to normal position.

Another result of the energization of relay 510 is that a circuit is completed extending from positive battery at make contact 2, conductor 469 and winding of relay 406 to negative battery. Relay 406 is energized over this path.

At armature 425, a circuit is now completed to hold the relay 406 energized under control of relay 405. This circuit may be traced over a path extending from positive battery at armature 424 and front contact, armature 425 and front contact, and winding of relay 406 to negative battery.

At armature 426 the energizing circuit of the wiper 410 is open, thus preventing further selections by the wiper 410.

The relays 502 and 510 are now maintained energized under control of relay 405, and these are the only selecting relays that may be energized during the transmission of the code or until after the long checking pause is received on the 25th impulse.

If the code of 25 impulses has been correctly received, the wipers 410 to 414 inclusive will reach the 25th contact on their associated switch banks at the same time the code sending switch has its wipers 301 to 304 inclusive on the 25th contact of their switch banks. The code sending and code receiving switches operate in an approximate synchronism in transmitting and receiving the code.

When the wipers 410 to 414 of the code receiving switch advance to contact 25 on their associated switch banks, the extra long pause and dash impulse received by relay 407 holds the wipers on this contact point for a period of time, sufficient to complete the desired selecting circuits.

When the wiper 413 is on contact point 25 of its switch bank, the energizing and holding circuits of relay 404 are opened, and relay 404 retracts its armatures after an interval of time to close through the final selecting circuit.

There is now a circuit completed extending from positive battery at wiper 413 and bank contact 25, armature 423 and back contact, conductor 471, make contacts 3 on relay 510 energized, make contacts 12 on relay 502 energized, conductor 550, and winding of relay 601 to negative battery. Relay 601 is energized over this path to connect the interposing control relay equipment of the apparatus unit C—1 to the selective remote control circuits.

Relay 601 is held energized under control of release relay 603. The holding circuit is completed over a path extending from positive battery at armature 639 and back contact, armature 626 and front contact, and winding of relay 601 to negative battery.

Another result of the energization of relay 601 is that a circuit is completed extending from positive battery at front contact and armature 627, and winding of relay 604 to negative battery.

Relay 604 is energized over this path and at armature 638 and front contact prepares checking circuits to be described later. At armature 640 and front contact positive battery is connected to conductor 469 to maintain relay 406 energized, under control of relays 604 and 603, when relay 405 is deenergized by the restoration of the code receiver to normal position.

When the 25th impulse has been received the code receiver switch rotates its wipers 410 to 414 inclusive to their normal position on contact 1 on their respective switch banks, where they remain until another code is received.

The relay 407 held magnet 409 energized on the 25th impulse for the entire pause period, and when relay 407 is deenergized the magnet 409 is in turn deenergized, to move the wipers 410 to 414 inclusive to their normal resting point.

With the wipers 410 to 414 inclusive on contact 1 of their switch banks, all code receiver equipment is restored to normal except relay 406 which is now held energized under control of relays 603 and 604.

The energizing circuit of relay 403 is opened at armature 428 to restore relay 403 to normal. Relay 403 in turn opens the energizing circuit of relay 402 at armature 420. The deenergization of relay 402 and the movement of wiper 411 to contact point 1 opens the energizing circuits of relays 400 and 401 and these relays restore to normal. At wipers 412 the remaining holding and energizing circuits are opened to restore relay 405 to normal position. The final selection will not be completed in case the wipers of the code receiver are not resting on contact 25 of their respective switch banks at the time the third and last pause point is introduced in the code of 25 impulses as will be apparent from the circuits described. The energizing circuit of relay 601 was completed due to the fact that a "pause" or "dash" impulse period occurred at the time the wiper 413 came to rest on contact 25 of its switch bank.

The relay 404 which is of the slow to release type is held energized while the wiper 413 moves over its bank contacts 2 to 24 inclusive. The wiper 413 opens the holding circuit of relay 404 when it moves to the 25th contact, and closes at this same contact, the energizing circuit for final selecting relay associated with the desired apparatus unit.

It is seen that unless the relay 404 retracts its armature 423 to close thru this circuit, that no selection can be made at this point. The stepping magnet 409 must hold the wipers 410 to 414 on contact 25 of their associated switch banks due to the "dash" impulse or "pause" point in the code, in order to complete these selecting circuits.

Assuming that the wipers 410 to 414 inclusive have been thrown out of synchronism with the wipers 301 to 304 inclusive of the code sender, due to an inductive disturbance on line conductors, or the loss or gain of an impulse by the receiving relay 407. No selection will be completed since the final pause will not find the wiper 413 on contact 25 of the switch bank. Then, in this case the relay 405 is deenergized upon restoration of the code receiver to normal, the holding circuits of any of the relays such as 510 to 519 inclusive, 502, 503, 504, and 505 which have been energized on the first two selecting pause points, are opened and these relays are deenergized to restore the selecting circuits to normal. And when the relays 407 and 403 are deenergized at the end of the code, the wipers 410 to 414 inclusive are rapidly restored to their normal position on contact 1 of their associated switch banks.

This is accomplished by a circuit to cause the magnet 409 to operate as an interrupter. The circuit may be traced from positive battery at wiper 412 and all its bank contacts 2 to 25 inclusive, armature 421 and back contact, armature 427 and make contact, and winding of stepping magnet 409 to negative battery. Each time the magnet 409 is energized over this path, it opens its own energizing circuit at armature 427, releases and moves its wipers to the next succeeding contact and so on until the wipers 410 to 414 inclusive come to rest in their normal position on contact 1 of their respective switch banks.

The relay 604 is common to all selecting relays such as 601, and 602 at station #2. As another result of the energization of the relays 601 and 604 in the manner described, a circuit is completed which extends from positive battery at armature 641 and front contact, conductor 650, contact and armature 760 of buzzer 701, winding of buzzer 701, primary winding of induction coil 702 to negative battery.

The buzzer and induction coil circuit just traced is an audible answer back device used to notify the dispatcher that a selecting relay such as 601 and 602 has been energized to connect its associated apparatus control relays to the remote control device. The buzzer 701 is operated and creates a tone in the primary winding of induction coil 702. This tone is amplified by the secondary winding and transmitted as a high frequency audible signal to the dispatcher over a path which may be traced from positive battery on conductor 352, secondary of induction coil 702, condenser 703, conductor 758, conductor 950, condenser 1032, conductor 1057, winding of loud speaker 1202, condenser 1203, and line conductor 352, to positive battery at station #2. The loud speaker 1202 is of the type used in radio work and is operated over the circuit just traced to signal the dispatcher that the code he has caused to be transmitted has resulted in the selection of an apparatus unit, and the connection of its interposing control circuit to the remote control device at station #2.

As a result of the energization of relay 604, the relay 406 is maintained energized as long as any of the relays such as 601 and 602 are energized. The energization of relay 406 prevents further selections from being made by wiper 410, but connects at armature 426 and front contact, the wiper 414 to the selecting circuits of relays 400, 401, and 404 of the code receiver, in such manner that another code transmitted from station #1 may now result in the operation of the code receiver to make further selections thru the circuits connected to the bank contacts of wiper 414.

*Remote control of selected apparatus unit*

The code determined by the operated key K—1 having resulted in the connection of the desired apparatus unit C—1 to the remote control device, the manner in which the remote control operations are performed will now be described.

The circuit breaker type unit C—1 at station #2 is shown on drawings as in the "tripped" position. The circuit wiring shown on the drawings illustrates the arrangement of connections when the circuit breaker C—1 is in this position.

Assuming that the dispatcher at station #1 desires to close the circuit breaker C—1, he operates the key K—103 to the "close" position to bring lever springs 184 and 183 into contact with their associated "make" springs, and operates the key K—102.

He may restore the key K—1 to normal if desired after the tone signal indicates that a selection has been made, and he must restore the key K—102 after the sending of each code to permit another code to be transmitted.

By the operation of the key K—102, the relay 112 is operated in the same manner as previously described. A circuit is then completed which extends from positive battery at armature 124 and back contact, armature 122 and front contact, armature 123 and back contact, contacts of key K—103 at spring combination 184, and winding of relay 111 to negative battery.

Relay 111 is energized over this path and at armature 119 and back contact opens the circuits of the selecting keys such as K—1 and K—11 in order to prevent the further sending of codes by these keys. At front contact and armature 119 a circuit is now completed which extends from positive battery at armature 124 and back contact, armature 122 and front contact, armature 123 and back contact, front contact and armature 119, conductor 168, back contact and armature 1204, conductor 169, winding of stepping magnet 210, back contact and armature 220, back contact and armature 227, back contact and armature 226, back contact and armature 228 and winding of resistance 229 to negative battery.

The stepping magnet 210 is operated as an interrupter in a manner previously described to position its wipers 215 to 218 inclusive on contact 23 of their associated switch banks. At this point there is a circuit completed extending from positive battery at wiper 215 and resting contact 23, conductor 155, made contact 183 of key K—103, conductor 164, and winding of relay 202 to negative battery.

The relay 202 is energized to stop the code finder with its wipers resting on bank contact 23 and to start the code sending operation in same manner as previously described.

Due to the position of the wipers 217 and 218 on their bank contacts, positive battery is placed on conductors 254 and 269 and as a result, the first pause in the code comes at impulse #7, and the second pause at impulse 12. The connections of conductor 254 and 269 to the bank contacts accessible to wiper 301 determines the code in the same manner as previously described.

The code sender also operates in the same manner as previously described. The code receiver at station #2 operates in the same manner as previously described except that the relay 406 is energized and the selections made at the pause points will be completed by the wiper 414.

At the first pause point there is a circuit completed which extends from positive battery at wiper 412 and resting contact 7, armature 421 and front contact, back contact and armature 415, armature 426 and front contact, wiper 414 and resting contact 7, conductor 464, armature 520 and back contact, winding of relay 504 to negative battery. Relay 504 is energized over this path.

At spring 1 on armature 527 and its make contact, a holding circuit is completed for relay 504 under control of relay 405 while at spring 2, a circuit is completed to energize relay 501.

At the second pause period the wipers 410 to 414 are resting on contact 12 of their associated bank contacts. At this point a circuit is completed which extends from positive battery at wiper 412 and resting contact, armature 421 and front contact, back contact and armature 416, armature 426 and front contact, wiper 414 and resting bank contact 12, conductor 468, winding of relay 508 to negative battery.

Relay 508 is energized over the above path and at armature 543 and front contact completes a holding circuit for itself under control of relay 405.

At the third pause period when wipers 410 to 414 are on contact 25 of their associated switch banks, providing the sending and receiving switches are in synchronism as previously described, a circuit is completed extending from positive battery at wiper 413 and bank contact 25, armature 423 and back contact, conductor 471, make contact 3 on armature 527, armature 544 and front contact, conductor 555, and winding of the relay 606 to negative battery. Relay 606 is thus energized to in turn energize relay 605 over an obvious path.

A circuit is then completed which extends from positive battery at armature 637 and front contact, armature 625 and front contact, and winding of relay 607 to negative battery.

Relay 607 is energized over this path and at armature 634 completes the 120 volt energizing circuit of contactor 620. Contactor 620 is energized to close thru at armature 690 the energizing circuit of the closing solenoid 674 of the circuit breaker C—1. The circuit breaker C—1 is operated to the closed position in the above manner.

The purpose of the slow release relays 605 and 606 is to maintain the energizing circuit of the solenoid 674 for a period of time after the energizing circuit of wiper 413 is opened, in order to insure that the circuit breaker C—1 is operated to its full close position before the current is disconnected from solenoid 674.

The relays 605 and 606 are not always needed in which case the circuit of solenoid 674 is completed directly by the positive battery on conductor 555. Some circuit breakers are exceptionally slow to operate to their close position however, and the slow release relays 605 and 606 are needed in such cases.

The dispatcher receives a visual indication of the operation which occurs by means of his supervisory devices, and by means of the supervisory code sending and receiving devices in a manner that will be described later.

The dispatcher then releases the key K—102 and restores the key K—103 to it's neutral or normal position.

In order to more fully explain the operation of the remote control devices and circuits, we will assume that the dispatcher at station #1, now desires to trip the circuit breaker C—1 at Station #2.

The dispatcher operates key K—103 to the opposite position, so that lever springs 185 and 186 engage their respective working contacts, and again operates the key K—102.

The stepping magnet circuit of the finder switch is again operated and the wipers come to rest at the point determined by the operated key K—103. The finder switch is stopped on the "trip" code point of key K—103 by reason of a circuit which is completed over a path extending from positive battery at wiper 215 and resting contact 23 of its switch bank, conductor 155, lever spring 186 and its working contact, conductor 163, and winding of relay 203 to negative battery. Relay 203 is operated over this path to open the energizing circuit of the stepping magnet 210, at armature 227. The finder switch then comes to rest with the wipers 215 to 218 inclusive positioned on contact 23 of their respective switch banks.

The energizing circuit of the stepping magnet was completed in the same manner as described in connection with the sending of the "close" control code.

The sending lamp signal 107 is lit over the same path, extending from negative battery interrupted by the movement of the wiper 303 over its bank contacts and the operation of magnet 305, conductor 273, wiper 216 and resting contact 23, conductor 156 filament of lamp signal 107 to positive battery. The sending lamp signal 107 blinks in response to the sending of the code due to the interruption of its energizing circuit at wiper 303 and at armature 340 on magnet 305. The dispatcher thus receives a visual indication that the "trip" control code is being transmitted.

The energization of relay 203, completes at armature 223, a circuit extending from positive battery at this point, winding of relay 206 to negative battery. Relay 206 is energized over this path.

It is seen that while the wipers 215 to 218 inclusive are again positioned on bank contact 23 of their respective banks just as was the case when the "close" code was transmitted that in this case the relay 203 and 206 are energized and as a result a distinctive code is transmitted for the "trip" operation.

The relay 206 when energized connects the circuits of wiper 218 to another set of conductors in such manner as to increase the number of distinctive codes that may be transmitted at the different positions of the wiper 218 on its bank contacts.

In this instance with wiper 218 on bank contact 23 and relay 206 energized, there is a circuit prepared which extends from positive battery at armature 124 and back contact, armature 122 and front contact, armature 123 and back contact, front contact and armature 119 on relay 111. (Relay 111 is energized over a parallel path by a circuit completed at lever spring 185 and working contact), conductor 168, back contact and armature 1204, conductor 169, wiper 218 and resting bank contact 23, armature 236 and front contact, conductor 268, and bank contact 11 on the switch bank of wiper 301, which will determine the second pause period.

The first pause period will occur when wiper 301 reaches contact point 7 on its switch bank. This point is determined by the position of wiper 217 on its switch bank contacts in a manner previously described.

The code sender is started and the code transmitted in the same manner as previously described.

At station #2, circuits of the wiper 414 are completed at bank contact points 7 and 11 to energize relays 504 and 509. Then at the third pause point on the 25th impulse, the circuits of relay 404 complete a circuit which extends from positive battery at wiper 413 and contact of rest 25, armature 423 and back contact, conductor 471, working pair of contacts 3 on relay 504, armature 546 and front contact, conductor 554, armature 628 and front contact, winding of relay 608 to negative battery.

Relay 608 is energized and at armature 635 and front contact completes a 120 volt energizing circuit for the contactor 621.

A circuit is now completed extending from positive 120 volt battery at armature 691 of contactor 621, made contacts on pallet switch armature 678, and winding of trip solenoid 675 to negative 120 volt battery.

The trip solenoid 675 is thus energized to "trip" the circuit breaker C—1.

In a manner that will hereinafter be described, supervisory circuits are completed at pallet switch armature 679 to start the supervisory code transmitter and to notify the dispatcher that the "trip" control order has been carried out.

*Disconnecting apparatus unit from remote control device*

Assuming now that the dispatcher desires to disconnect the apparatus unit C—1 from the remote control circuits. The deenergization of relay 601 will disconnect the interposing relays 607 and 608, contactors 620 and 621 and associated controlling solenoids 674 and 675 from the circuits of the relays 506 to 509 inclusive, relay 527 and wiper 414. As previously described the relay 601 is maintained energized under control of relay 603.

The dispatcher at station #1 operates the key 101 so that lever springs 182 and 181 engage their respective working contacts. He then operates key K—102.

Relay 111 is again energized and the stepping magnet 210 operated to step the wipers 215 to 218 inclusive to bank contact 22 on their respective banks.

At this point a circuit is completed by wiper 215 to cause the energization of relay 203. This circuit may be traced from positive battery on wiper 215 as a result of the operation of key K—102, bank contact 22 conductor 154, contacts of key K—101, conductor 163, and winding of relay 203 to negative battery.

Relay 203 when energized over the above circuit, in turn causes the energization of relay 206.

The resting point of wiper 217 on bank contact 22 determines that the first pause in the transmitted code will occur on the 7th impulse. The resting point of wiper 218 and the energization of relay 206 determines that the second pause in the transmitted code will occur on the 10th impulse.

The code sender is started in the same manner as previously described.

The sending signal 108 is flashed over a circuit which includes the wiper 216 and resting contact 22 on its switch bank, armature and front contact on relay 201 which is energized as a result of the energization of relay 203, conductor 160, filament of lamp signal 108 to positive battery. The circuit of wiper 216 is completed in the same manner as previously described.

At station #2 as a result of the code received in the same manner as before described, the selecting circuits of wiper 414, effect the energization of relays 504 and 506. The selecting circuit of wiper 414 energizes relay 504 due to the pause which occurs when the wiper 414 is resting on contact 7 of its switch bank. The selecting circuit of wiper 414 energizes relay 506 due to the pause which occurs when the wiper 414 is resting on contact 10 of its switch bank, over the circuit which includes conductor 466.

With relays 506 and 504 held energized under control of relay 405, when the wipers 410 to 414 inclusive reach the 25th point on their respective switch banks, at which point the third pause occurs, there is a circuit completed which extends from positive battery at wiper 413 and resting contact 25, armature 423 and back contact, conductor 471, working pair of contacts 3 on relay 504 and armature 527, armature 540 and front contact, conductor 552, winding of relay 603 to negative battery.

Relay 603 is energized over this path and at armature 639 opens the holding circuit of the relay 601. Relay 601 is then released to disconnect the interposing control relays of the circuit breaker C—1 from the remote control circuits.

The switch circuits are restored to normal and relay 603 again deenergized at the end of the third pause period in the received code.

The dispatcher may then restore keys K—102 and K—101 to their normal position and the entire code sending and receiving devices will then be in their normal position of rest.

*Operation of supervisory code transmitting and receiving apparatus*

The relays 705 to 707 inclusive are the supervisory interposing relays associated with the unit C—1.

The pallet switch of the unit C—1 is shown diagrammatically. This switch consists of two knife blade type levers or armatures 678 and 679. The armatures are in the position shown on drawing Figure 6 when the unit C—1 is in the open or tripped position. As a result the circuit of trip solenoid 675 is open at armature 678. At armature 679 a circuit is completed which extends from positive battery (60 volt tap) at this armature which bridges its two contacts, conductor 654, and winding of relay 707 to negative battery. Relay 707 is energized over this path.

With relay 707 energized a circuit is completed extending from positive battery at contacts of pallet switch armature 679, conductor 654, armature 718 and front contact, armature 715 and back contact, armature 712 and front contact, winding of relay 705, winding of resistance 770, back contact and armature 729 to negative battery. Relay 705 is held energized over this path after being energized as a result of a transmitted supervisory code.

The relay 707 also determines the location of the second pause period in the transmitted code, over circuits which will be described later, while the relay 705 governs the location of the first pause point and starts the code sending operation.

When the unit C—1 was operated to the "close" position in the manner previously described, the energizing circuit of relay 707 was opened at the contacts of pallet switch armature 679.

The relay 705 which is a fast type relay is deenergized, and after a slight interval of time the relay 707 retracts its armatures. At armature 718 another point in the holding circuit of relay 705 is opened. At armature 719 a circuit is completed to cause the energization of relay 706. At armature 716 on relay 706 when energized, a holding circuit is prepared for relay 705, effective when relay 705 is again energized.

Due to the deenergization of relay 705, a circuit is completed extending from positive battery at armature 714 and back contact, conductor 744, winding of stepping magnet 808, back contact and armature 809, back contact and armature 812, back contact and armature 814, and winding of resistance 830 to negative battery. The stepping magnet 808 is energized over this path.

The stepping magnet 808 when energized positions its associated pawl and ratchet mechanism in such manner that the wipers 801 to 804 inclusive, mounted on a common shaft, are moved one step from their point of rest when the magnet is again deenergized.

Each time magnet 808 is energized the relay 807 is energized over a circuit extending from positive battery at armature 813 and back contact, winding of relay 807, top contact and armature 815 back contact and armature 812, back contact and armature 814, and winding of resistance 830 to negative battery.

When relay 807 is energized the circuit of the stepping magnet 808 is opened at armature 809. The magnet 808 then deenergizes to again open the circuit of relay 807. Relay 807 retracts its armature after an interval of time to again close thru the operating circuit of magnet 808.

In this manner the stepping magnet 808 is operated as an interrupter, the operation continuing until the wipers 801 and 802 reach the bank contacts to which is connected the circuits of the deenergized relay 705.

The circuits of relay 705 are connected to bank contact 2 on the switch bank of wipers 801 to 802, and when the wipers reach this point, there is a circuit completed which extends from positive battery at wiper 801 and resting contact 2, conductor 740, armature 711 and back contact, conductor 745, winding of relay 806 to negative battery.

Relay 806 is energized over this path to open the energizing circuit of the magnet 808 at armature 812 and back contact. The wipers 801 to 804 inclusive then come to rest on contact 2 of their respective switch banks.

The resting point of the wipers 801 to 804 inclusive on their respective bank contacts and the position of the armatures of relay 707 (energized or deenergized) determine the code which is transmitted to indicate visually to the dispatcher at station #1, that the unit C—1 is in the closed position.

As another result of the energization of relay 806, a circuit is completed extending from negative battery, winding of resistance 830, armature 814 and back contact, armature 812 and front contact, conductor 851, winding of interrupter relay 914, armature 915 and contact, switch bank common 960, and resting wiper 901 to positive battery.

The interrupter relay 914 is energized over this path, attracts the pendulum 916 so that it completes a circuit at contact 917 to cause the energization of relay 908, and opens its own energizing circuit at armature 915.

The pendulum 916 is then released and springs back to complete an energizing circuit for relay 907 at contact 918, and again closes its own energizing circuit at armature 915. The interrupter relay 915 continues to operate in this manner to alternately close the energizing circuits of relays 908 and 907.

When relay 908 is energized another circuit is completed extending from positive battery at armature 919 and front contact, winding of relay 907 to negative battery. The purpose of this circuit is to insure that the relay 907 will retract its armature after relay 908 has released its armatures and to make more positive the restoration of certain circuits to normal, as will be described later.

As another result of the energization of relay 806 a circuit is now completed which extends from positive battery at armature 810 and front contact, conductor 852, windings of relays 905 and 906 in parallel, armature 921 and front contact, armature 932 and resting contact, and winding of resistance 959, to negative battery. Relays 905 and 906 are energized in parallel over this path. The relay 906 is the code transmitting relay and is of the regular fast type, while relay 905 is a slow to release type relay.

As a result of the energization of relay 907, the energizing circuit of the normally energized relay 909 is opened at armature 922 and back contact.

Relay 909 is of the slow to release type and retracts its armatures a slight interval of time after its energizing circuit is opened.

At armature 925 and front contact the circuit for operating the magnet 913 under control of wiper 903 is opened. At armature 926 another point in this same circuit is opened. At armature 927 there is a circuit completed which extends from negative battery, winding of resistance 958, armature 927 and back contact, winding of relay 911, back contact and armature 931, to positive battery.

Relay 911 is energized over this path, and as a result, there is a circuit completed which extends from positive battery at armature 930 and back contact, front contact and armature 928, armature 923 and front contact, winding of stepping magnet 913, wiper 902 and resting contact, back contact and armature 927, winding of resistance 958 to negative battery.

The stepping magnet 913 is energized over this path. It then positions its associated pawl and ratchet mechanism in such manner that the wipers 901 to 904 inclusive, mounted on a common shaft are stepped one point, from contact 1 to contact 2, when the stepping magnet 913 is again deenergized.

The bank contacts 1 to 25 inclusive of wiper 902 are strapped common so that the magnet 913 may be energized over the above circuit from positions #1 to 24 inclusive of the wiper 902 on its bank contacts.

Each time the magnet 913 is energized over the above traced path, the energizing circuits of relays 906 and 905 are opened. Relay 906 is immediately deenergized and relay 905 retracts its armature 923 a slight interval of time after its circuit is opened. At armature 923, when relay 905 is deenergized, the energizing circuit of magnet 913 is opened, and the magnet is deenergized. It then steps its wipers forward one step to the succeeding bank contact, and again closes the energizing circuit of relays 905 and 906, at armature 932.

Relays 905 and 906 again energize to close through the energizing circuit of magnet 913. Magnet 913 then again energizes to open the energizing circuit of relays 905 and 906.

The operation proceeds in this manner until the wipers 901 to 904 inclusive have been operated over all of their associated bank contacts, but under the control of circuits which may introduce pause periods in the transmitted code.

The relay 906 is energized and released following each operation of the stepping magnet 913 to close and open the energizing circuit of the relay 1008 located at station #1.

The codes transmitted consist of 25 impulses, the distinction between codes being in the relative location of two pause points, on which the relay 906 is held energized a sufficient length of time to permit the selecting circuits of the remotely controlled relay 1008 to function and prepare the desired selection.

The selection is completed only in case the operation of the code sending and receiving circuits on the 25th impulse indicate that the transmitted code has been correctly received at station #1.

In this instance the first pause is transmitted when wipers 901 to 904 inclusive, reach contact 3 on their respective switch banks. At this point there is a circuit completed which extends from positive battery at wiper 804 and resting contact, conductor 860, bank contact 3 and resting wiper 904, and winding of relay 912 to negative battery.

Relay 912 is energized over this path to open at armature 930, one point in the energizing circuit of the magnet 913.

The circuit of the magnet 913 will not again be closed until slow release relays 910 and 911 retract their armatures. The pause period occurs during the interval required for the release of relay 911 which has its energizing circuit opened at armature 931 as a result of the energization of relay 912, and the subsequent release of the armature of relay 910. The circuit over which relay 910 was energized is opened at armature 929 by the deenergization of relay 911.

When the slow to release relays 911 and 910 have retracted their armatures, the circuit for the energization of the magnet 913 is again completed over a path which extends from positive battery at armature 930 and front contact, back contact and armature 928, armature 923 and front contact, winding of magnet 913, wiper 902 and resting contact, back contact and armature 927 and winding of resistance 958 to negative battery.

The magnet 913 is again energized over this path and at armature 932 opens the energizing circuit of relays 905 and 906. Relay 905 then slowly retracts its armature 923 to again open the energizing circuit of the stepping magnet 913. The magnet 913 steps it's wipers to the next bank contact at which point the energizing circuit of relay 912 is again opened.

Relay 912 releases to in turn energize relays 911 and 910 in cascade, in the same manner as before described.

The second pause period occurs when the wiper 904 reaches contacts 12 on its switch bank, as at this point relay 912 is again energized over a path which extends from positive battery at wiper 803 and its resting contact 12, conductor 747, armature 726 and back contact, conductor 748, bank contact 12 and resting wiper 904, and winding of relay 912 to negative battery.

The operation of relays 912, 911, 910, 905, 906, and magnet 913, is the same as described in connection with the first pause in the code.

At station #1, the relay 1008 has been energized and de-energized each time relay 906 was energized and deenergized. The energizing circuit of relay 1008 may be traced over a path which extends from positive battery at station #1, conductor 352 which is connected to positive battery at station #2, armature 924 and front contact, conductor 950, and winding of relay 1008 to negative battery.

When relay 1008 is energized, there is a circuit completed which extends from positive battery at armature 1030 and front contact, winding of relay 1007 to negative battery. The relay 1007 is of the slow to release type and does not retract its armatures during the rapid operation of relay 1008.

By the energization of relay 1007, other operating circuits of the magnet 1010 are opened at armature 1029 and back contact.

Each time relay 1008 is energized there is a circuit completed which extends from positive battery at armature 1031 and front contact, and winding of stepping magnet 1010 to negative battery. The stepping magnet 1010 is energized over this path and positions its pawl and ratchet mechanism so as to cause the movement of wipers 1011 to 1014 inclusive, one step in their step-by-step operation over their associated bank contacts, effective when the magnet 1010 is again deenergized.

The stepping magnet 1010 is deenergized each time relay 1008 is deenergized, and in this manner the wipers 1011 to 1014 inclusive at station #1, are operated from their normal positions, in an approximate synchronism with the wipers 901 to 904 of the code sending switch at station #2. The normal position of the wipers of both the code receiving and code sending switches is on contact 1 of their associated switch banks.

If the code is correctly transmitted and received, the final pause on the 25th impulse will occur with the wipers of both the code sending and the code receiving switches resting on contact 25 of their respective switch banks.

Each time relay 1008 is deenergized, there is a circuit completed extending from positive battery at armature 1030 and back contact, armature 1027 and front contact (the relay 1007 is energized on first impulse) and winding of relay 1001 to negative battery. Relay 1001 is energized in this manner to maintain certain circuits of relays 1002 and 1003 during the operation of relay 1008.

At armature 1015 a circuit is complete for the energization of relay 1003, while at armature 1016 a circuit is completed for the energization of relay 1002.

The relays 1002 and 1003 are used in completing the selecting circuits of the wiper 1011. These relays are of the slow to release type. When the wiper 1012 has moved off of its normal position on bank contact 1 to the remaining contacts of its switch bank, there is an energizing circuit completed alternately for the relays 1003 and 1002. These circuits are provided to insure that only one of the relays 1002 and 1003 will retract its armature at the pause periods in the received code.

The contacts 2 to 24 inclusive of the switch bank associated with wiper 1014 are strapped common and when the stepping magnet has operated to position the wiper 1014 on the contact 2 there is a circuit completed, extending from positive battery at wiper 1014 and bank contact, armature 1028 and front contact, and winding of relay 1006 to negative battery.

Relay 1006 is energized over this path and completes at armature 1024 a holding circuit for itself under control of the wiper 1014 and its bank contacts 2 to 24 inclusive.

The bank contacts 2 to 25 inclusive of the switch bank associated with wiper 1013 are strapped common. As wiper 1013 is operated over the contacts 2 to 25 inclusive there is a circuit completed which extends from positive battery at wiper 1013 and its resting contact, winding of relay 1005 to negative battery.

Relay 1005 is energized over this path to prepare holding circuits to be described later and to complete a circuit extending from positive battery at armature 1021 and front contact, conductor 335 and winding of relay 315 to negative battery.

Relay 315 is energized over this path to maintain the line conductor 351 disconnected from the code sending circuits of relay 314, during the supervisory code receiving operation.

The line circuit 351 is opened at armature 333 and back contact and is connected at the front contact of this armature to a checking circuit which will be described later.

As a further result of the energization of relay 1006 in the manner described, certain final selecting circuits are maintained open at armatures 1025 and 1026. These circuits are not again closed during the operation of the code receiver, unless a long pause period occurs while the wiper 1014 is resting on its bank contact 25.

In this instance the first pause period in the code of impulses transmitted occurs when the wipers of the code sending and code receiving switches rest on contact 3 of their respective switch banks. The second pause occurs when the wipers are on contact 12 of their switch banks.

The relay 1008 at station #1 is maintained energized during the pause periods.

At the first pause period the relay 1001 being deenergized, the relay 1003 will retract its armature to complete a circuit which extends from positive battery at wiper 1013 and resting contact, armature 1029 and front contact, armature 1018 and back contact, armature 1020 and back contact, wiper 1011 and resting bank contact 3, conductor 1040, armature 1128 and back contact, and winding of relay 1104 to negative battery.

The relay 1104 is energized over this path. As a result a locking circuit is completed for this relay over a path extending from positive battery at armature 1022 and front contact conductor 1055, armature spring 1 and its working contact at armature 1125, and winding of relay 1104 to negative battery.

As another result of the energization of relay 1104, there is a circuit completed which extends from positive battery at armature 1125, lever spring 2 and working contact, and winding of relay 1101 to negative battery.

The relay 1101 is energized over the above traced path and at its armatures 1128 to 1131 opens the energizing circuits of the relays 1102 to 1104 inclusive. This is to prevent another operation of the multi-contact group selection relays at the first pause period, or should another pause incorrectly be introduced while the wiper 1011 is passing over the bank contacts 3 to 6 inclusive. The armature 1129 has no relay circuit shown but is intended to illustrate that the wiper 1011 is not limited to the control of the operation of three relays such as 1102 to 1104, inclusive.

At the second pause period, the relay 1002 retracts its armature to complete a circuit which extends from positive battery at wiper 1013 and resting contact, armature 1029 and front contact, armature 1017 and back contact, armature 1020 and back contact, wiper 1011 and resting bank contact 12, conductor 1044, and winding of relay 1105 to negative battery.

Relay 1105 is energized over the above traced path. As a result a circuit is completed which extends from positive battery at armature 1022 and front contact, conductor 1055, lever spring 1 on armature 1124 and its working contact, winding of relay 1105 to negative battery. A holding circuit is closed for relay 1105 over the above traced path.

As another result of the energization of relay 1105, there is a circuit completed which extends from positive battery at lever spring 2 on armature 1124 and its working contact, conductor 1054 and winding of relay 1004 to negative battery.

Relay 1004 is energized over the above traced path. This relay is then held energized over a circuit extending from positive battery at armature 1021 and front contact, armature 1019 and front contact, and winding of relay 1004 to negative battery. At armature 1020 the circuit of the wiper 1011 is opened to prevent further selecting operations of this wiper until after the code receiver apparatus has been restored to its normal position.

By the energization of relays 1104 and 1105 in the manner just described, a final selecting circuit has been prepared. The selection will be completed to record a change in supervisory signals only in case the code has been correctly transmitted and received as will be checked by means of a third and totalizing pause period. If the wipers of code sending and receiving switches are resting on contact 25 of their respective switch banks on the 25th impulse, the third pause period in the code will result in a selection at station #1. By this method the transmission and receipt of 25 impulses constituting the code is verified.

Assuming that the code sending and code receiving switches have operated in synchronism, the operation of the selecting circuits will be as follows:

With the wiper 901 of the code sending switch resting on bank contact 25, the energizing circuit of interrupter relay 914 is opened. The pendulum 916 will vibrate for a period of time, however, before it comes to rest midpoint between contacts 917 and 918.

The energizing circuit of the magnet 913 is open at the switch bank of the wiper 902, so that the magnet 913 remains deenergized, holding relays 905 and 906 energized during the time the pendulum vibrates between its contact points 917 and 918 to hold relays 908 and 907 energized. This is the manner in which the code sending switch provides the long pause period on the 25th impulse.

With the wipers 1011 to 1014 inclusive, of the code receiver at station #1 resting on contact 25 of their respective switch banks at the time the third and totalizing pause occurs in the transmitted code, the relay 1008 is energized over the line circuit, and the energizing circuit of relay 1006 is opened as a result of the movement of the wiper 1014 to it's bank contact 25.

Relay 1006 retracts its armatures after a slight interval of time, to complete a circuit which extends from positive battery at wiper 1014 and its bank contact 25, armature 1025 and back contact, conductor 1056, lever spring 3 and its working contact on relay 1105, working contact 12 and lever spring on armature 1125 of relay 1104, conductor 173, winding of resistance 190 to negative battery. The relay 109 which was held energized over the circuit extending from positive battery at armature 115 and front contact, winding of relay 109, and winding of resistance 190 to negative battery; is now deenergized as a result of the circuit just traced which closes a circuit extending from positive battery to the winding of resistance 190 in such manner as to short circuit the winding of relay 109.

The relay 109 when deenergized, opens at armature 115 its holding circuit, while at armature 116 and front contact the energizing circuit of the lamp signal 102 is opened. At the back contact of armature 116 there is a circuit completed which extends from positive battery at said armature, filament of the lamp signal 101 to negative battery.

The lamp signal 101 is lit to indicate that the circuit breaker C—1 at station #2 has been operated to the "closed" position.

At station #2, as another result of the movement of the wiper 901 to bank contact 25, there is a circuit completed which extends from positive battery on wiper 901 and bank contact 25, conductor 490, and winding of relay 408 to negative battery. Relay 408 is energized over this path.

In parallel with this circuit, there is another completed over conductor 890 for the energization of relay 805.

There is now a circuit completed which extends from positive battery, back contact and armature 1026, conductor 334, front contact and armature 333, conductor 351, armature 430 and front contact, conductor 491, armature 811 and front contact, conductor 853, armature 920 and its front contact, conductor 854, wiper 802 and resting bank contact 2, conductor 742, winding of relay 705, winding of resistance 770, and back contact and armature 729 to negative battery. The relay 705 is energized over this path.

A holding circuit is now completed for the relay 705 over a path which extends from positive battery at armature 719 and back contact, armature 716 and front contact, armature 713 and front contact, winding of relay 705, winding of resistance 770, and back contact and armature 729 to negative battery.

Since the relay 1006 is deenergized only in case there is a long pause period in the received code while the wipers of the code receiver switch at station #1 are resting on contact 25 of their respective switch banks, and since relay 408 is energized only when the wipers of the code sending switch are on bank contact 25 of their respective switch banks, it is seen that the relay 705 can only be energized when the code transmitting and code receiving switches are in synchronism at the time the 25th impulse is transmitted and received.

This is the principal guarantee against false operation, as unless the relay 705 is energized, the code will be again transmitted by the code sender at station #2 and the final selecting circuits of relay 1006 armatures 1025 and 1026 are incomplete.

As a result of the energization of relay 705, the original energizing circuit of the magnet 808 is opened at 714, while at armature 711 the remaining circuits to the finder switch are opened.

After a period of time the pendulum 916 comes to rest mid-point between contacts 917 and 918, to open the energizing circuits of relays 908 and 907.

Relay 908 retracts its armatures to open the energizing circuit of the wiper 802. This is the circuit over which relay 705 was energized.

Relay 906 is deenergized as a result of the opening of its energizing circuit at armature 921, while at armature 919, another energizing circuit of relay 907 is opened.

Relay 907 retracts its armature after a slight interval of time to complete a circuit which extends from positive battery at armature 922 and back contact, and winding of relay 909 to negative battery.

Relay 909 is energized over this path and at armature 927 opens the energizing circuit of the relay 911, and of the stepping magnet 913 at another point.

However there is another circuit now completed which extends from positive battery at armature 925 and front contact, winding of magnet 913, front contact and armature 926, back contact and wiper 903 (still on contact 25 of its switch bank), armature 932 and resting contact and winding of resistance 959 to negative battery. The stepping magnet 913 is again energized over this path, positions its pawl and ratchet mechanism and opens at armature 932, the energizing circuit just traced. The magnet is then deenergized to step the wipers 901 to 904 inclusive to bank contact 1 on their respective switch banks. This is the normal position of the wipers of the code sender.

The relay 911 retracts its armature after an interval of time to open the energizing circuit of relay 910. Relay 910 then retracts its armature to open the original stepping magnet operating circuits.

As a result of the deenergization of relay 907, the holding circuit of relay 806 is opened at armature 922 and relay 806 is deenergized. The release of relay 806 in turn causes the deenergization of relay 905.

When the wiper 901 moves to contact 1 of its switch bank the energizing circuit of relay 805 is opened and relay 805 is released.

The apparatus of the code sender is now in its normal position.

At station #1, as a result of the deenergization of relays 906 and 1008, the energizing circuit of the magnet 1010 is opened at armature 1031 and the magnet then releases and moves its wipers 1011 to 1014 to contact 1 on their respective switch banks. This is the normal position for the wipers of the code receiver.

The energizing circuit of relay 1007 is opened at armature 1030. Relay 1007 retracts its armature to open at armature 1027, the energizing circuit for relay 1001. This relay is then deenergized.

The movement of the wipers 1011 to 1014 inclusive to contact 1 of their respective switch banks, opens energizing circuits of relays 315, 1005, and of the relays 1002 and 1003. These relays of the code receiver are thus restored to normal position.

As a result of the deenergization of relay 1005, the holding circuit of relays 1104, and 1105 are opened and these relays are deenergized. This results in the deenergization of the relays 1101 and 1004.

All equipment of the code receiver is now restored to normal position and all selecting circuits are opened at station #1. The apparatus is now in position to receive another code.

Assuming now that the circuit breaker C—1 "trips" out under control of local devices (not shown).

At the contacts of pallet switch armature 679, a circuit is again closed to effect the energization of relay 707.

The energizing circuits of relay 706 and the holding circuit of relay 705 are opened at armature 719.

The relay 705 is immediately deenergized, but the relay 706 is slow to release and retracts its armatures after a slight interval of time to prepare holding circuits for the relay 705. These are effective when relay 705 is again energized.

At armatures 714 and 711 the circuits of the finder switch are again closed. The finder switch operates from its position of rest to associate its wipers with the circuits of relays 705 and 707.

The code sender is again started and the code transmitted in the same manner as before described. The code transmitted is different however. The wipers 801 to 804 inclusive rest on the same contact 2 of their associated switch banks and the first pause period in the transmitted code is in the same position, however, due to the energization of relay 707 in this instance, the second pause period will occur when wiper 904 rests on contact 13 of its switch bank. At this point there will be a circuit completed which extends from positive battery at armature 813 and back contact, armature 811 and front contact (relay 806 energized over same path previously described) wiper 803 and resting bank contact 2, conductor 746, armature 717 and front contact, conductor 749, bank contact 13 and wiper 904, and winding of relay 912 to negative battery. Relay 912 is energized and functions at this point in the same manner as before described to provide the second selecting pause in the code of 25 impulses.

At station #1, as a result, the second selecting pause point occurs when wipers 1011 to 1014 are resting on contact 13 of their respective switch banks. As a result there is a circuit completed which extends from positive battery at wiper 1013 and resting contact, armature 1029 and front contact, armature 1018 and back contact, armature 1020 and back contact, wiper 1011 and resting contact 13, conductor 1045, and winding of relay 1106 to negative battery.

Relay 1106 is energized over this path, and is locked energized under control of relay 1005. The energization of relay 1106 also causes the energization of relay 1004. The circuit operations are the same as before described.

At the final selecting pause point in this instance, there is a circuit completed which extends from positive battery at wiper 1014 and bank contact 25, armature 1025 and back contact, conductor 1056, the working pair of contacts 3 on relay 1106, working contacts 11 on relay 1104, conductor 172, winding of relay 109, winding of resistance 190 to negative battery.

Relay 109 is energized over this path and at armature 115 is locked energized over obvious circuits.

At armature 116 the energizing circuit of lamp signal 101 is opened while at the front contact of armature 116 the energizing circuit of lamp signal 102 is completed.

The lamp signal 101 is extinguished, and the lamp signal 102 is lit to indicate the change in position of the circuit breaker C—1 that has taken place.

It is seen that each relay such as 1104, 1103, and 1102 has a selecting capacity of ten supervisory indications. As for instance to indicate the open and closed position of 5 apparatus units. These relays are termed "group" selecting relays.

The "final" selecting relays 1105 to 1114 inclusive are common to any number of "group" relays such as 1102 to 1104 inclusive.

*Verifying the operation of selecting and supervisory apparatus*

Means are provided to enable the dispatcher or operator at station #1 to verify the operation of the selecting devices. He can obtain a visual indication of the number and position of any apparatus unit which he has selected for observation or control without causing an operation of said apparatus unit.

He may check individually the accuracy of any supervisory indication desired or, he may check all supervisory indications by means of his signalling devices.

To illustrate this feature of the invention, we will assume that the dispatcher desires to check the accuracy of the supervisory indications associated with the circuit breaker C—11 at station #2. He desires to select the unit C—11 as for control and verify such selection and check his supervisory signals.

The circuit breaker C—11 is shown in Figure #6 as in the "tripped" position, however the lamp signal 104 in Figure #1 is shown lit to indicate a closed condition of the unit. This has been so arranged in order to fully describe the important "checking" or verifying features of the system.

In order to select the circuit breaker C—11, and to cause its connection to the control and checking apparatus at station #2, the dispatcher operates the K—11 so that lever springs 177 and 178 make connection with their working contacts. He then operates the master sending key K—102.

By the operation of key K—102, the relay 112 is energized. This completes the operating circuits of the finder switch stepping magnet.

By the operation of key K—11 the finder switch is caused to stop in position with its code selecting and code sending apparatus associated with this key.

The wipers 215 to 218 stop on contact 11, because of the circuit completed which extends from positive battery on wiper 215 and resting contact 11, conductor 153, lever spring 178 and working contact, conductor 164, and winding of relay 202 to negative battery. The energizing circuit of the stepping magnet is opened at armature 226 and its back contact, as a result of the energization of relay 202 over the above traced path.

The operating circuits of the code sender are closed at the front contact of armatures 225 and 226 as a result of the energization of relay 202.

The code sending operation then proceeds in the same manner as before described.

The code transmitted is determined by the position of the wipers 215 to 218 inclusive on their respective switch banks. With wiper 217 on bank contact 11, positive battery is connected to conductor 251, thence to bank contact 4 of the switch bank associated with wiper 301. With wiper 218 on bank contact 11, positive battery is connected to conductor 264, thence to bank contact 21 of the switch bank associated with wiper 301. The relay 313 will be operated when the wiper 301 rests on its bank contact 4 to transmit the first selecting pause and on bank contact 21 to transmit to second selecting pause. The manner in which the pause periods are introduced in the code has been described.

At station #2, the wipers 410 to 414 inclusive of the code receiver are operated in an approximate synchronism with the wipers 301 to 304 inclusive of the code sending switch at station #1. As a result the wipers 410 to 414 inclusive rest on contact 4 of their respective switch banks, when the first selecting pause is received and on contact 21 when the second selecting pause is received.

The first selection is made over a path which extends from positive battery at wiper 412 and resting contact, armature 421 and front contact, armature 416 and back contact, armature 426 and back contact, wiper 410 and resting contact 4, conductor 451, armature 523 and back contact and winding of relay 503 to negative battery.

Relay 503 is energized over this path, is locked energized under control of relay 405 and causes the energization of relay 501, to open its original energizing circuits and the circuits of the remaining "group" selecting relays 525, 526, and 528.

The second selection is made over a path which extends from positive battery at wiper 412 and resting contact, armature 421 and front contact, back contact and armature 415, armature 426, and back contact, wiper 410 and resting contact 21, conductor 462 and winding of relay 518 to negative battery.

Relay 518 is energized over the above traced path, locks energized under control of relay 405 and causes the energization of relay 406. Relay 406 disconnects the energizing circuit of the wiper 410 and switches selecting circuits to the wiper 414.

At the third pause period when wipers of both code sending and receiving switches must rest on contact 25 of their associated bank contacts in order to complete the selecting operation, we have a circuit completed which extends from positive battery at wiper 413 and bank contact 25, armature 423 and back contact, conductor 471, the fourth set of working contacts of relay 503, conductor 553, and winding of relay 602 to negative battery.

Relay 602 is energized over this path and at armature 631 and front contact completes a holding circuit for itself under control of relay 603.

The interposing control relays of the circuit breaker C—11 are now connected to the remote control apparatus comprising the selecting circuits of the wiper 414, the relays 506 to 509 inclusive and relays 605 and 606.

At front contact and armature 632 a circuit is completed to cause the energization of relay 604.

The apparatus of the code sender at station #1 and the code receiver at station #2 is now restored to rest in a manner previously described. Code sending operations are stopped to await further operations by the dispatcher and by means of the audible signal device the dispatcher is apprised that a selection has been completed and an apparatus unit connected to the remote control device. The audible signal is operated over a circuit previously described and originating as a result of the energization of relay 604. The tone signal continues as long as the apparatus unit is connected to remote control apparatus.

The dispatcher may now obtain a visual indication to identify the selected apparatus unit and at the same time verify the supervisory indications of its position by operating the key K—100, in such manner that the lever springs 179 and 180, make connection with their working contacts, and by operating the key K—102.

The starting circuit of the finder switch is again closed and relay 111 is energized to prevent other selecting operations in case selecting keys such as K—1, and K—11 are operated.

The finder switch comes to rest with its wipers on contact 22 of their respective switch banks. At this point there is a circuit completed which extends from positive battery on wiper 215 and resting contact 22, conductor 154, key spring 180 and working contact, conductor 164 and winding of relay 202 to negative battery. Relay 202 is energized over this path to open the stepping magnet circuit at back contact and armature 226, and to start the code sender by means of circuits closed at armatures 225 and 226 and their respective front contacts.

The code sending operation proceeds as before described to transmit the code determined by the position of the wipers 215 to 218 inclusive, on contact 22 of their respective switch banks.

With wiper 217 on contact 22 positive battery is connected to conductor 254 and bank contact 7 of the switch bank of wiper 301.

With wiper 218 on contact 22 and relay 206 deenergized positive battery is connected to conductor 267 and bank contact 9 of the switch bank associated with wiper 301.

Due to these connections the relay 313 will be energized to introduce selecting pause periods when the wiper 301 rests on contacts 7 and 9 in its movement over the 25 contacts of its associated switch bank.

At station #2, the wipers 410 to 414 inclusive operate in synchronism with those of the impulse sending switch. The selecting circuit of wiper 414 now is the only selecting path provided since relay 406 is held energized over conductor 469 as a result of the energization of relay 604.

At contact 7 on its switch bank the wiper 414 will complete a circuit which includes conductor 464, armature 520 and back contact and the winding of relay 504, to cause the energization of relay 504.

Relay 504 then locks energized under control of relay 405 and causes the energization of relay 501 to disconnect the operating circuits of all relays 502 to 505 inclusive.

At contact 9 on its switch bank the wiper 414 completes a circuit which extends from positive battery on wiper 412, and resting contact, armature 421 and front contact, back contact and armature 415, armature 426 and front contact, wiper 414 and resting contact 9, conductor 465, and winding of relay 507 to negative battery. Relay 507 is energized over this path.

Relay 507 locks energized under control of relay 405, at armature 541 and its front contact.

When the wipers 410 to 414 inclusive, reach contact 25 of their respective switch banks, at which point the third pause period occurs, there is a circuit completed which extends from positive battery at wiper 413 and bank contact 25, armature 423 and back contact, conductor 471, the third pair of working contacts on relay 504, armature 542 and front contact, conductor 551, armature 638 and front contact, armature 629 and front contact, conductor 653, winding of relay 708, front contact and armature 721, back contact and armature 724, front contact and armature 727, conductor 655, and contacts of pallet switch at lever 681 to positive battery.

The holding circuit of the relay 708 which was completed thru the winding of resistance 771 to negative battery, is short-circuited over the above traced path, and the relay 708 is deenergized.

The code sending and code receiving switches now restore to normal in the same manner as before described and release the relays 507, 504, and 501 which were energized during the selecting operation.

The deenergization of relay 708, causes the operation of the finder switch circuit and code sender circuit to transmit the code corresponding to circuit breaker C—11 and its position, to the code receiver at station #1, as well as to operate certain checking signal lamps in a manner which will be explained hereinafter.

At armature 723 the finder switch stepping magnet is energized while at armature 720 a circuit is prepared which will stop the operation of the magnet when the wipers of the finder switch reach the point on their switch banks to which the circuits of the relays 708 and 710 are connected.

When the wipers 801 to 804 inclusive rest on contact 12 of their respective switch banks, there is a circuit completed which extends from positive battery at wiper 801 and bank contact 12, conductor 741, armature 720 and back contact, conductor 745 and winding of relay 806 to negative battery. Relay 806 is energized over this path to open the operating circuit of the stepping magnet 808 at back contact and armature 812. At the front contact of armature 812 and at front contact of armatures 810 and 811 circuits are completed to start the code sending operation and to cause the transmission of the code in the same manner as previously described.

There is a circuit prepared which extends from positive battery at armature 813 and back contact, armature 811 and front contact, wiper 804 and resting bank contact 12, conductor 858, and thence to bank contact 5 of the switch bank associated with wiper 904. When the wiper 904 reaches this contact of the switch bank, the relay 912 will be energized to introduce the first selecting pause in the transmitted code, in the same manner as previously described in connection with the transmission of codes.

There is also a circuit prepared which extends from positive battery at armature 813 and back contact, armature 811 and front contact, wiper 803 and bank contact 12, conductor 747, armature 726 and front contact, conductor 749, and bank contact 13 of the bank associated with wiper 904 and when wiper 904 reaches this contact, the relay 912 will be again energized to cause the transmission of the second selecting pause period in the code.

At station #1 the operation of the code receiver is the same as previously described except that the selecting circuits of the wiper 1011 occur in this instance when this wiper rests on bank contacts 5 and 13.

When wiper 1011 rests on bank contact 5 and the first selecting pause period occurs, the relay 1103 is energized, over a path which includes wiper 1011, bank contact 5, conductor 1042, armature 1130 and back contact and winding of relay 1103 to negative battery. Positive battery is connected to wiper 1011 as a result of the selecting pause period in a manner previously described.

Relay 1103 completes a locking circuit for itself at the #1 pair of working contacts, and causes the energization of relay 1101 at the #2 pair of working contacts. Relay 1103 is now held energized under control of relay 1005, as the original energizing circuits of relays 1102 to 1104 inclusive is opened by the energization of relay 1101.

When wiper 1011 reaches bank contact 13 and the second selecting pause occurs, positive battery is again connected to wiper 1011 to complete a circuit which extends from the wiper and contact 13, conductor 1045, and winding of relay 1106 to negative battery. Relay 1106 is energized over this path. At the #1 set of working contacts the relay 1106 is locked energized under control of relay 1005. At the #2 set of working contacts a circuit is completed to cause the energization of relay 1004 which disconnects all selecting circuits of the wiper 1011 at armature 1020. The circuits are now prepared to complete the final selecting operation which takes place on the 25th impulse and totalizing impulse.

As another result of the energization of relay 1103 and as a result of the holding circuit now effective on this relay, there is a parallel circuit completed at the #1 working contacts of relay 1103, conductor 1145, filament of lamp signal 1221, and winding of relay 1200 to negative battery. The lamp signal 1221 is held energized under control of relay 1005 over this path.

As a result of the energization of relay 1106 there is a circuit completed in parallel with its holding circuit which extends from positive battery at armature 1022 and front contact, conductor 1055, working contact pair #1 on relay 1106, conductor 1148, filament of lamp signal 1231, and winding of relay 1200 to negative battery. The lamp signal 1231 is lit over this path.

The relay 1200 is also energized in series with the energizing circuits of the lamps 1221 and 1231 to open the circuits of the code sender at armature 1204 and prevent further code sending operations until the supervisory code has been recorded. The lamp signals 1220 to 1222 inclusive are directly associated with relays 1102 to 1104 inclusive; in this manner the lamp signal 1220 to 1222 inclusive which is lit at the first pause period in the code, indicates the relay such as 1102 to 1104 inclusive which is energized.

The lamp signals 1223 to 1232 inclusive are associated respectively with relays 1105 to 1114 inclusive in a similar manner to indicate the relay which is energized on the second pause period.

As the relays 1102 to 1104 inclusive and 1105 to 1114 inclusive are energized in a different combination for each distinctive code, it is seen that the lamp signals 1220 to 1232 may be used as a visual indication of the code set-up in the code receiver as a result of the incoming impulses.

The lamp signals in this manner act as telltale signals on all incoming supervisory signals. The dispatcher can then determine by means of a key chart or designations on the lamp signals the number and position of the apparatus unit which is sending thru the supervisory code. The lamp signals may further be used in checking incoming codes or in recording the failures of the supervisory code receiving devices. If a code is set up on lamp signals which does not result in the proper operation of the supervisory relays associated with the code being received, the dispatcher is aware that the code receiver and code transmitter are not operating in synchronism, and therefore not correctly totalizing on the 25th impulse of the code.

The tell-tale lamp signals remain lit only until the code is fully recorded and the supervisory receiver restored to normal, except when the key K—1250 is operated to cause its lever spring to make connection with its working contact. In this case, a holding circuit is completed for relay 1005, over a path which extends from positive battery at contacts of key K—1250 conductor 1058, and winding of relay 1005 to negative battery. Relay 1005 is energized to maintain at armature 1022 and front contacts, the holding circuits of any of the relays such as 1102 to 1104 inclusive, and 1105 to 1114 inclusive, which may be energized as a result of the received code. The lamp signals such as 1220 to 1232 corresponding to the energized relays will then remain lit to enable the dispatcher to easily identify the incoming code by means of the tell-tale lamp signals.

In the present instance as the lamp signals 1221 and 1231 are lit the dispatcher is apprised that the received code indicates that the circuit breaker C—11 has been selected, and that the circuit breaker is in the tripped position.

However, the lamp signal 104 is lit which indicates that the circuit breaker C—11 is closed. He then watches the result of the final totalizing operation on the 25th impulse.

As a result of the third pause on the 25th impulse there is a circuit completed which extends from positive battery at wiper 1014 and resting contact 25, armature 1025 and back contact, conductor 1056, #3 pair of working contacts on relay 1106, #11 pair of working contacts on relay 1103, conductor 170, winding of relay 110, winding of resistance 191, to negative battery. The relay 110 is energized over this path.

At armature 118 and front contact, a locking circuit is completed for relay 110, while at armature 117 and back contact the circuit of the lamp signal 104 is opened and this lamp is extinguished.

At armature 117 and front contact a circuit is completed to light the lamp signal 105 which indicates to the dispatcher that the circuit breaker C—11 at station #2 is in the "tripped" position. The tell-tale lamp signal operation as described verifies this fact.

The code sending and code receiving switch are now restored to normal in the same manner as previously described.

Having verified the selection of the circuit breaker C—11 the dispatcher may now cause its operation, or release the selection in the same manner as described in connection with the selection, operation and release of the devices associated with circuit breaker C—1 as previously described.

The sending signal 103 was operated as the selecting code for C—11 was transmitted. The sending signal 106 was operated as the check code was transmitted. These lamps are connected to the bank contacts of the wiper 216 to complete their indicating circuits in a similar manner as previously described.

In case no selection has been set up at station #2 by the energization of a relay such as 601 and 602 to connect an apparatus unit to the remote control circuits, and the check key K—100 is operated to send a check code the result will be the energization of relay 704. The relay 604 is not energized unless an apparatus unit is connected to the remote control device. The circuit completed as a result of the check code will then include armature 638 and back contact, conductor 651 and winding of relay 704 to negative battery.

Relay 704 when energized, opens at armature 729, the holding circuits of all relays such as 705 and 708 and causes the sending of all supervisory codes to indicate the number and position of all apparatus units at station #2. The various codes are transmitted in the same manner as before described. The master check operation is of use in case of a battery supply interruption which may falsify temporarily the supervisory signals on the dispatchers control and supervisory panel.

The invention has been disclosed in certain specific arrangements, which are deemed desirable, however it is understood that it is capable of embodiment in many and widely varied forms without departing from the spirit and scope of the invention as defined in the appended claims.

Having thus described my invention, what I desire to claim and secure by United States Letters Patent is:

1. In a selective distant control and supervisory system, a means of presetting a plurality of control code sending operations, a code finder device to which said presetting means are connected in a definite order, means for indicating the position of said code finder device, a code transmitting device, and means including said pre-setting means operative to cause the transmission of said control code sending operations in an irregular order, and regardless of the order in which said control codes are present on said control code sending device.

2. A distant control system for controlling a plurality of remote apparatus units from a station comprising means for selecting one of said units from said station and connecting it to a remote control device, indicating means becoming operative when the selection has been made for indicating at said station that a selection has been made and means operative from said station to indicate at said station the selection made and the position of the unit selected independently of said first named indicating means.

3. A distant control system for controlling a plurality of remote apparatus units from a single station including means for selecting any one of said units and connecting it to a remote control device, means for causing a change in the position of said selected unit by sending a code from said station, and means interrupting the sending of the code and sending a supervisory signal to said station when a change in position of any of said units occurs.

4. A distant control system for controlling a plurality of remote apparatus units from a single station including means for selecting any one of said units and connecting it to a remote control device, means for causing a change in the position of said selected unit by sending a code from said station, and means interrupting the sending of the code and sending a supervisory signal to said station when a change in position of any of said units occurs without releasing the unit selected from its remote control device.

5. A system of the character described having a signal sending and a signal receiving station, a plurality of elements at said receiving station whose actuation is selectively controllable from said sending station, control means at said receiving station individual to each of said elements whereby said control actuation may be effected, primary selecting means at said receiving station individual to each of said elements, means at the sending station operable to select any desired primary selecting means, means at said receiving station for sending a signal to said sending station only upon selection of the desired primary selecting means, and means at said sending station controlled by the receipt of a signal at said receiving station corresponding to the predetermined selected primary selecting means to control the operation of the control means corresponding to the selected primary selecting means, and checking means at said sending station operable to check the selection made independently of the said signal sending means.

In witness whereof, I hereunto subscribe my name this 24th day of January, A. D. 1927.

THOMAS U. WHITE.